United States Patent
Watanabe et al.

(10) Patent No.: US 10,664,931 B2
(45) Date of Patent: May 26, 2020

(54) DATA ANALYZING SYSTEM AND METHOD

(71) Applicant: Hitachi, Ltd., Tokyo (JP)

(72) Inventors: Tohru Watanabe, Tokyo (JP); Kouichirou Iijima, Tokyo (JP); Yu Ikemoto, Tokyo (JP); Youichirou Morita, Tokyo (JP); Mitsuyoshi Kondo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 194 days.

(21) Appl. No.: 15/123,746

(22) PCT Filed: Mar. 6, 2015

(86) PCT No.: PCT/JP2015/056739
§ 371 (c)(1),
(2) Date: Sep. 6, 2016

(87) PCT Pub. No.: WO2015/133635
PCT Pub. Date: Sep. 11, 2015

(65) Prior Publication Data
US 2017/0018038 A1 Jan. 19, 2017

(30) Foreign Application Priority Data
Mar. 7, 2014 (JP) .................. 2014-045749

(51) Int. Cl.
*G06Q 50/06* (2012.01)
*H02J 3/00* (2006.01)
*G06Q 30/02* (2012.01)

(52) U.S. Cl.
CPC ......... *G06Q 50/06* (2013.01); *G06Q 30/0202* (2013.01); *H02J 3/00* (2013.01);
(Continued)

(58) Field of Classification Search
None
See application file for complete search history.

(56) References Cited

U.S. PATENT DOCUMENTS

2002/0161664 A1* 10/2002 Shaya ............... G06Q 30/02
705/7.31
2003/0120370 A1* 6/2003 Kitayama ........... H02J 3/008
700/100
(Continued)

FOREIGN PATENT DOCUMENTS

JP 2001-134577 A 5/2001
JP 2002-169613 A 6/2002
(Continued)

OTHER PUBLICATIONS

M. Halkidi, Y. Batistakis and M. Vazirgiannis, "Clustering algorithms and validity measures," Proceedings Thirteenth International Conference on Scientific and Statistical Database Management. SSDBM 2001, Fairfax, VA, USA, 2001, pp. 3-22. (Year: 2001).*
(Continued)

*Primary Examiner* — Matthew S Gart
*Assistant Examiner* — Camille M Galloway
(74) *Attorney, Agent, or Firm* — Mattingly & Malur, PC

(57) ABSTRACT

Proposed is a data analyzing system and method capable of performing highly reliable analytical processing which matches the actual situation. In a data analyzing device and method in which load data is classified into a plurality of clusters in consumer units based on the load data representing the power usage of each consumer for each unit time and the attribute information of each consumer, a diagnostic decision tree is generated for classifying the consumer into one of the clusters based on the attribute information of that consumer.

10 Claims, 20 Drawing Sheets

(52) U.S. Cl.
CPC ........... *H02J 2203/20* (2020.01); *Y02E 60/76* (2013.01); *Y04S 40/22* (2013.01); *Y04S 50/14* (2013.01)

(56) References Cited

U.S. PATENT DOCUMENTS

| | | | |
|---|---|---|---|
| 2010/0228604 A1* | 9/2010 | Desai | G06Q 30/02 705/7.31 |
| 2010/0332373 A1* | 12/2010 | Crabtree | G06Q 40/04 705/37 |
| 2012/0136911 A1* | 5/2012 | Mochizuki | G06K 9/6219 708/422 |
| 2013/0226922 A1* | 8/2013 | Labenski | G06F 16/35 707/737 |
| 2014/0067476 A1 | 3/2014 | Seki et al. | |
| 2015/0120639 A1* | 4/2015 | Shin | G06N 20/00 706/52 |
| 2015/0161233 A1* | 6/2015 | Flora | G06F 16/285 707/737 |
| 2015/0213564 A1 | 7/2015 | Ishida et al. | |

FOREIGN PATENT DOCUMENTS

| | | |
|---|---|---|
| JP | 2003-189471 A | 7/2003 |
| JP | 2006-011715 A | 1/2006 |
| JP | 2008-178606 A | 8/2008 |
| JP | 2009-277136 A | 11/2009 |
| WO | 2014/033800 A1 | 3/2014 |

OTHER PUBLICATIONS

Japanese Office action received in corresponding Japanese Application No. 2016-506204 dated Mar. 20, 2018.
Extended European Search Report received in corresponding European Application No. 15759029.0 dated Oct. 5, 2017.
Japanese Office Action received in corresponding Japanese Application No. 2018-212892 dated Feb. 4, 2020.

* cited by examiner

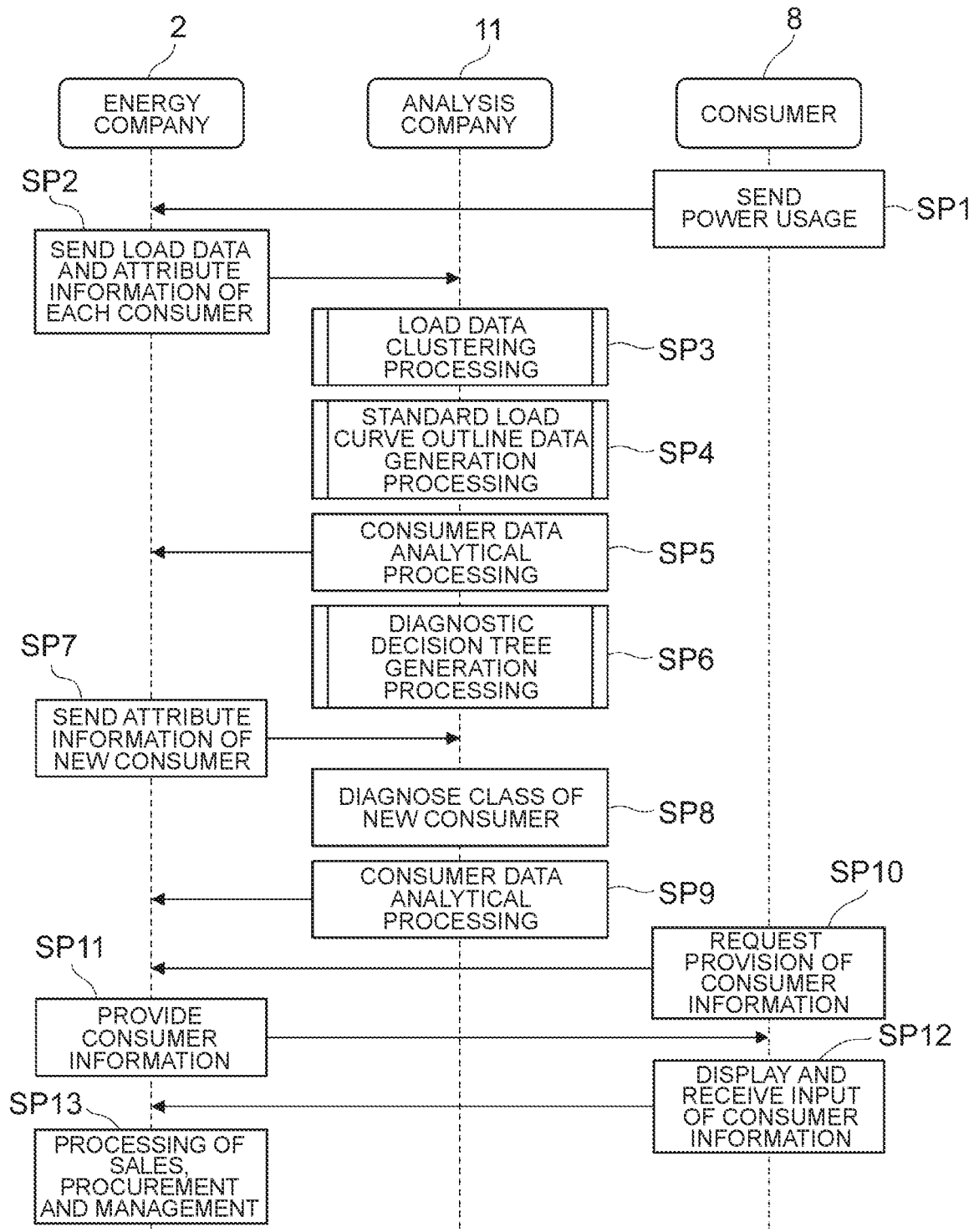

FIG.5

| CONSUMER ID | ITEM | | VALUE |
|---|---|---|---|
| CONSUMER ID=1 | LOAD DATA | | {100.0kW,150kW,⋯} |
| | ATTRIBUTE INFORMATION | MONTHLY INTEGRAL POWER USAGE | {10000kWh, 14000kWh,⋯} |
| | | LOCATION (GEOGRAPHY) | {A+30.0,B+130.0} |
| | | RATE MENU | LATE NIGHT DISCOUNT TYPE A |
| | | LOCATION (SYSTEM FEEDER NUMBER) | 101 |
| | | CONTRACTED POWER RECEPTION | 500kW |
| | | POWER RECEPTION EQUIPMENT | CHP:10kW |
| | | CLUSTER NUMBER | 170 |
| | | CLASS NUMBER | 70 |
| CONSUMER ID=2 | LOAD DATA | | null |
| | ATTRIBUTE INFORMATION | MONTHLY INTEGRAL POWER USAGE | {400000kWh, 560000kWh,⋯} |
| | | LOCATION (GEOGRAPHY) | {A+40.0,B+140.0} |
| | | RATE MENU | |
| | | LOCATION (SYSTEM FEEDER NUMBER) | 203 |
| | | CONTRACTED POWER RECEPTION | 20000kW |
| | | POWER RECEPTION EQUIPMENT | CHP:400kW |
| | | CLUSTER NUMBER | 2 |
| | | CLASS NUMBER | 60 |
| ⋯ | ⋯ | | ⋯ |

| CLUSTER ID | ITEM | VALUE |
|---|---|---|
| CLUSTER k=1 | NUMBER OF SAMPLE CONSUMERS | 4000 |
| | SAMPLE CONSUMER ID LIST | {1,2,4,⋯,5780} |
| | CLUSTER CENTER | [0,100,100,0,0,200,⋯,0] |
| | TOTAL POWER SHARE | 10% |
| | TOTAL CONSUMPTION SHARE | 15% |
| CLUSTER k=2 | NUMBER OF SAMPLE CONSUMERS | 20000 |
| | SAMPLE CONSUMER ID LIST | {5,6,7,⋯,33201,34000} |
| | CLUSTER CENTER | [100,100,0,0,0,0,⋯,0] |
| | TOTAL POWER SHARE | 10% |
| | TOTAL CONSUMPTION SHARE | 10% |
| ... | ... | ... |

| CLASS ID | ITEM | VALUE |
|---|---|---|
| CLASS z=1 | STANDARD LOAD CURVE | [0,100,100,0,0,200,···,0] ),200,···,0] |
| | CLUSTER NUMBER LIST | {1}    {1} |
| | CONSUMER ID LIST | 4    4 |
| | STATISTICAL INFORMATION LIST | {TOTAL POWER USAGE MW, 1000} {POWER USAGE DURING TIGHT POWER SUPPLY MW, 5000} {INCREASE IN POWER USAGE RELATIVE TO TEMPERATURE MW, 500} |
| | VALID ENERGY SAVING INVESTMENT LIST | {CHP 100 kW,NIGHTTIME CONTRACT A} |
| CLASS z=2 | STANDARD LOAD CURVE | [0,100,100,0,0,200,···,0] ),200,···,0] |
| | CLUSTER NUMBER LIST | {1}    {1} |
| | CONSUMER ID LIST | 4    4 |
| | STATISTICAL INFORMATION LIST | {TOTAL POWER USAGE MW, 1000} {POWER USAGE DURING TIGHT POWER SUPPLY MW, 5000} {INCREASE IN POWER USAGE RELATIVE TO TEMPERATURE MW, 500} |
| | VALID ENERGY SAVING INVESTMENT LIST | {CHP 100 kW,NIGHTTIME CONTRACT A} |
| ... | ... | ... |

30BA    30BB    30BC    30B

FIG.12
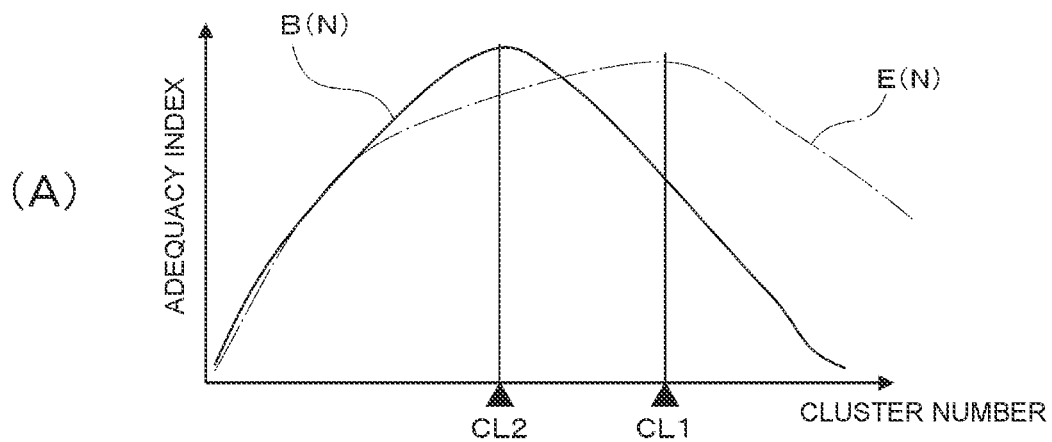
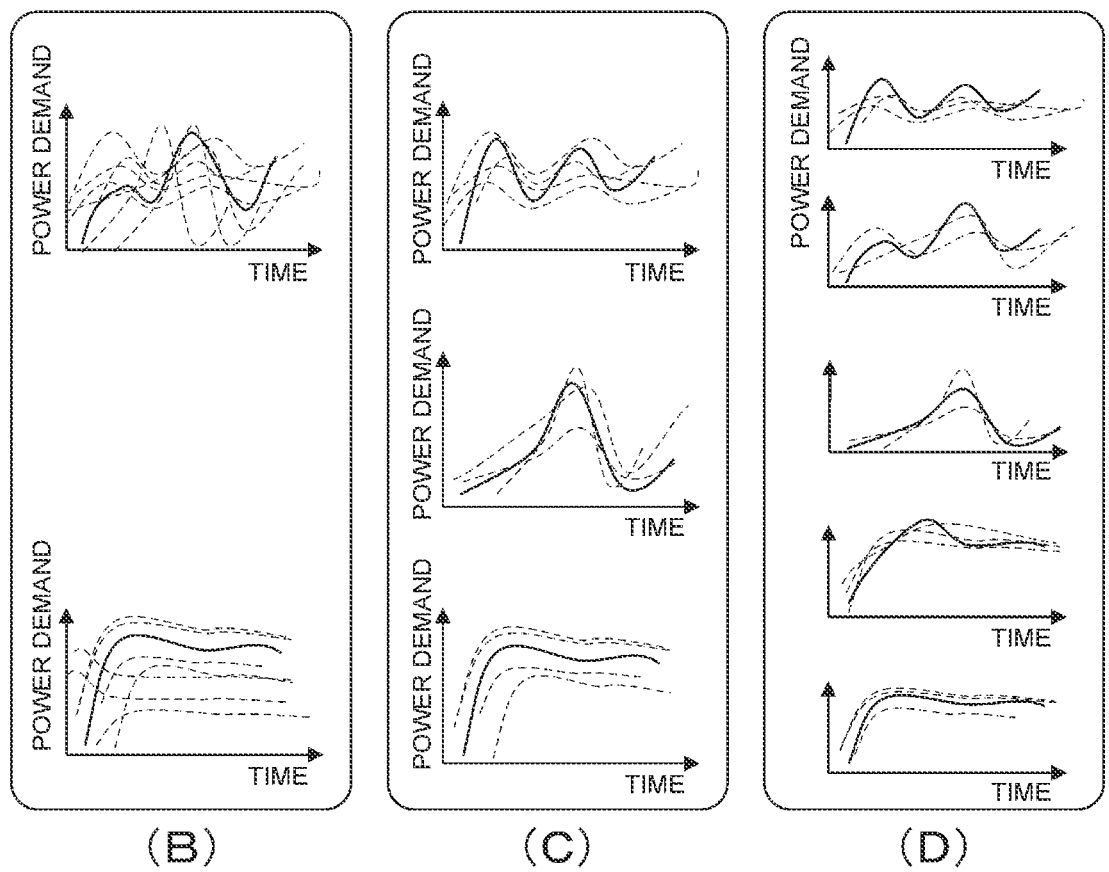
(B)  (C)  (D)

DATA ANALYZING SYSTEM AND METHOD

TECHNICAL FIELD

The present invention relates to a data analyzing system and method, and, for instance, can be suitably applied to an energy selling system.

BACKGROUND ART

Conventionally, in order to stably supply power to their customers (consumers), energy companies analyze the electrical power demand based on time series data of power usage for each unit time collected from the respective consumers, and adjust the power generation amount or adjust the power from the electric power exchange based on the analysis result.

In relation to this kind of analytical processing of the electrical power demand, for example, PTL 1 discloses a similarity analysis evaluation system which extracts the feature quantity focusing on the shape of the time series data, performs arbitrary classification based on the extracted feature quantity, and performs relevance evaluation based on the attribute of the time series data and the classification result.

Furthermore, PTL 2 discloses a load curve estimation system which categories a plurality of consumers into groups in which the consumption pattern of resources is similar, generates, for each group, a standard load curve representing the consumption pattern of resources of that group, identifies the group to which the consumer to be subject to estimation belongs, and estimates the resource consumption of the consumer to be subject to estimation for each unit time within an arbitrary period by using the standard load curve of the identified group.

CITATION LIST

Patent Literature

PTL 1: Japanese Laid-Open Patent Application Publication No. 2009-277136
PTL 2: Japanese Laid-Open Patent Application Publication No. 2006-11715

SUMMARY OF THE INVENTION

Problems to be Solved by the Invention

However, with the similarity analysis evaluation system disclosed in PTL 1, upon classifying the feature quantity focusing on the shape of the time series data into a plurality of clusters, since the cluster number is set manually, there is a problem in that the feature quantity cannot be classified into an appropriate number of clusters according to the actual situation.

Furthermore, even with the load curve estimation system disclosed in PTL 2, the groups of the consumption pattern are set in advance, and, similar to PTL 1, there is a problem in that the consumption pattern of resources of consumers cannot be classified into an appropriate number of groups according to the actual situation.

When it is not possible to classify the feature quantity or the consumption pattern into an appropriate number of clusters or groups according to the actual situation as in PTL 1 and PTL 2, the adjustment of the power generation amount and the procurement of electricity from the electric power exchange that are performed based on the analysis result will not match the actual situation, and there is a possibility that that there may be deficiency or excess in the required electrical energy.

Furthermore, according to the technologies disclosed in PTL 1 and PTL 2, there is a problem in that new consumers, from which the time series data and consumption pattern have not been acquired, and existing consumers, from which the time series data and consumption pattern cannot be acquired, cannot be classified into appropriate clusters and groups. Consequently, in the same manner as described above, the adjustment of the power generation amount and the procurement of electricity from the electric power exchange that are performed based on the analysis result will not match the actual situation, and there is a possibility that that there may be deficiency or excess in the required electrical energy.

The present invention was devised in view of the foregoing points, and an object of this invention is to propose a data analyzing system and method capable of performing highly reliable analytical processing which matches the actual situation.

Means to Solve the Problems

In order to achieve the foregoing object, the present invention provides a data analyzing system comprising a server device which collects load data representing power usage of each consumer for each unit time, and manages attribute information of each of the consumers, and a data analyzing device which classifies the load data into a plurality of clusters in consumers units based on the load data of each of the consumers for each unit time that is periodically notified from the server device and the attribute information of each of the consumers, wherein the data analyzing device generates a diagnostic decision tree for classifying the consumers into one of the clusters based on the attribute information of each of the consumers.

Moreover, according to the present invention, in the data analyzing system, the data analyzing device calculates an intra-cluster relevance representing a degree of unity of the load data in each of the clusters when assuming that a cluster number is respectively 1 to M (M is number of the consumers), and an inter-cluster average degree of separation representing a degree of separation of the clusters, and decides the cluster number to be used upon classifying the load data based on the calculation result.

The present invention additionally provides a data analyzing method executed in a data analyzing system comprising a server device which collects load data representing power usage of each consumer for each unit time, and manages attribute information of each of the consumers, and a data analyzing device which classifies the load data into a plurality of clusters in consumers units based on the load data of each of the consumers for each unit time that is periodically notified from the server device and the attribute information of each of the consumers, wherein the data analyzing device generates a diagnostic decision tree for classifying the consumers into one of the clusters based on the attribute information of each of the consumers.

Moreover, according to the present invention, the data analyzing method comprises a first step of the data analyzing device calculating an intra-cluster relevance representing a degree of unity of the load data in each of the clusters when assuming that a cluster number is respectively 1 to M (M is number of the consumers), and an inter-cluster average degree of separation representing a degree of separation of the clusters, and a second step of the data analyzing device deciding the cluster number to be used upon classifying the load data based on the calculation result.

According to the data analyzing system and the data analyzing method of the present invention, it is possible to also classify new consumers from which load data has not been acquired and existing consumers from which load data cannot be acquired into appropriate clusters.

Furthermore, according to the data analyzing system and the data analyzing method of the present invention, since the intra-cluster relevance and the inter-cluster average degree of separation when assuming that a cluster number is respectively 1 to M (M is number of the consumers) are actually calculated and the cluster number to be used upon classifying (clustering) the load data is decided based on the calculation result, it is possible to perform appropriate clustering which matches the actual situation.

Advantageous Effects of the Invention

According to the present invention, it is possible to realize a data analyzing system and method capable of performing highly reliable analytical processing which matches the actual situation.

BRIEF DESCRIPTION OF DRAWINGS

FIG. 4 is a timing chart showing a flow of the series of processing executed by the energy selling system in relation to the data analyzing function.

FIG. 5 is a conceptual diagram showing a schematic configuration of the energy company transmission data database.

FIG. 6 is a conceptual diagram showing a schematic configuration of the cluster attribute information table.

FIG. 7 is a conceptual diagram showing a schematic configuration of the class attribute information table.

FIG. 12A to FIG. 12D are characteristic curve charts explaining the optimal cluster number decision processing.

DESCRIPTION OF EMBODIMENTS

Figure 1:
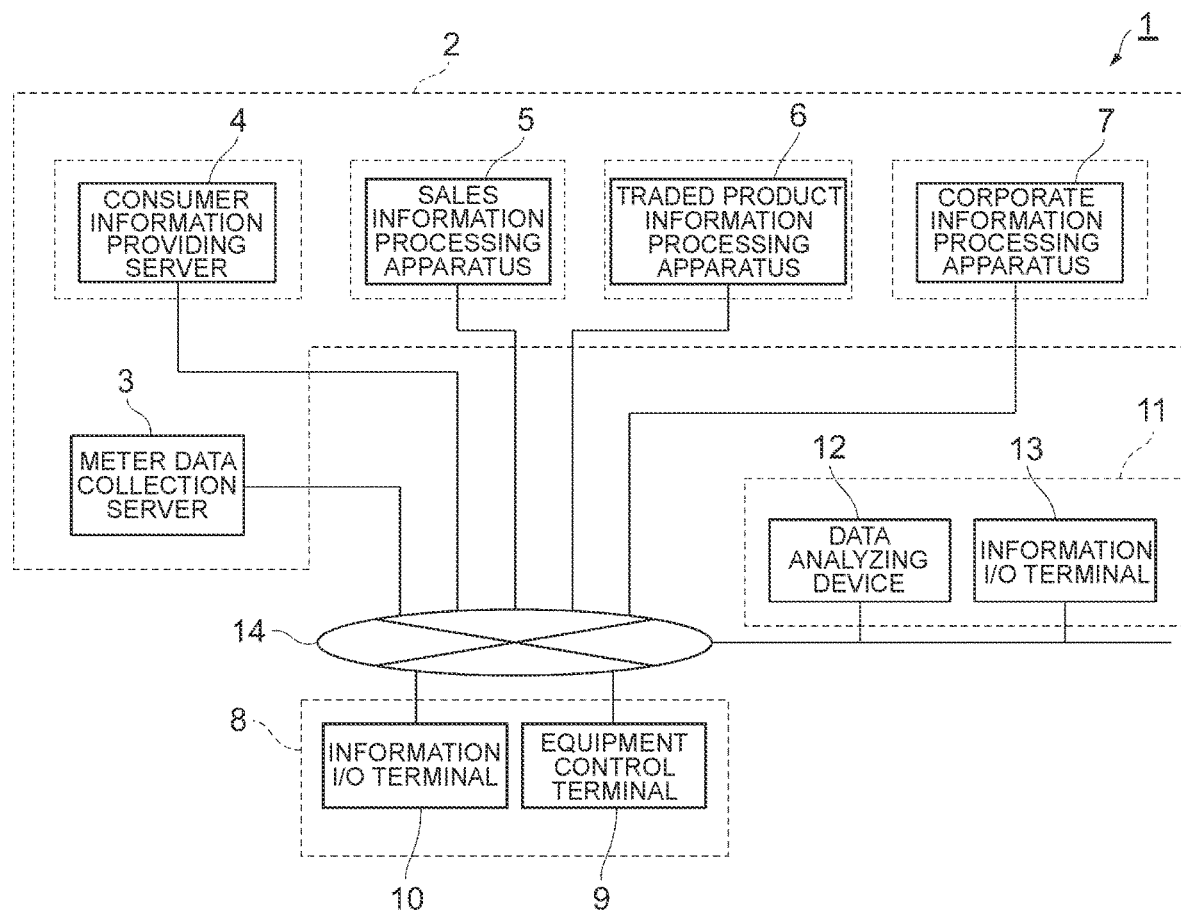
FIG. 1 is a block diagram showing an overall configuration of the energy selling system according to this embodiment.

An embodiment of the present invention is now explained in detail with reference to the appended drawings.
(1) Configuration of Electrical Power Demand Analyzing System According to this Embodiment In FIG. 1, reference numeral 1 shows the overall energy selling system according to this embodiment. The energy selling system 1 is configured by a meter data collection server 3, a consumer information providing server 4, a sales information processing apparatus 5, a traded product information processing apparatus 6 and a corporate information processing apparatus 7 of an energy company 2, an equipment control terminal 9 and an information I/O terminal 10 respectively equipped in each consumer 8 receiving the supply of electricity from the energy company 2, and a data analyzing device 12 and an information I/O terminal 13 of an analysis company 11 being connected via a network 14.

The equipment control terminal 9 equipped in the consumer 8 is configured, for instance, from a smart meter. The equipment control terminal 9 measures the power usage of the consumer 8, and sends the measurement result as load data to the meter data collection server 3 of the energy company 2. Furthermore, the information I/O terminal 10 of each consumer 8 is configured, for instance, from a personal computer equipped with a browser. The information I/O terminal 10 is used for the consumer 8 to access the consumer information providing server 4 of the energy company 2.

The meter data collection server 3 of the energy company 2 is a server device with a function of accumulating and managing the load data sent from the equipment control terminal 9 of each consumer 8. The meter data collection server 3 manages, together with the load data of each consumer 8, attribute information of each consumer 8 that is registered in advance such as the geographical location, contracted rate menu, system feeder number, contracted power reception and power reception equipment. The meter data collection server 3 periodically sends the accumulated attribute information and load data of each consumer 8 to the data analyzing device 12 of the analysis company 11.

The consumer information providing server 4 is configured from a general-purpose server device, and presents an electrical power load curve (this is hereinafter referred to as the "load curve") representing the transition of the future power usage of the consumer which is estimated by the data analyzing device 12 of the analysis company 11 as described later in response to a request from the consumer 8, and provides information such as the rate menu and equipment (district heating and cooling equipment, heat pump water heater, regenerative heating equipment or the like) recommended for the consumer 8 based on the determination of the data analyzing device 12 of the analysis company 11.

The sales information processing apparatus 5 is a computer device that is installed in the sales office of the energy company 2, and is used for the energy company 2 to acquire analysis results related to sales from the data analyzing device 12 of the analysis company 11. Furthermore, the traded product information processing apparatus 6 is a computer device that is installed in the power generation/procurement office of the energy company 2, and, for instance, accesses the website for electricity trading provided by the electrical power exchange and performs buying bid of required electricity or selling bid of excess power. Furthermore, the corporate information processing apparatus 7 is a computer device that is installed in the management office of the energy company 2.

The data analyzing device 12 of the analysis company 11 is a computer device with a function of analyzing the past electrical power demand based on the load data and attribution information of each consumer 8 sent from the meter data collection server 3 of the energy company 2. Furthermore, the information I/O terminal 13 of the analysis company 11 is configured, for instance, from a personal computer equipped with a browser. The information I/O terminal 13 is used when the analysis company 11 is to perform the maintenance of the data analyzing device 12.

Figure 2:
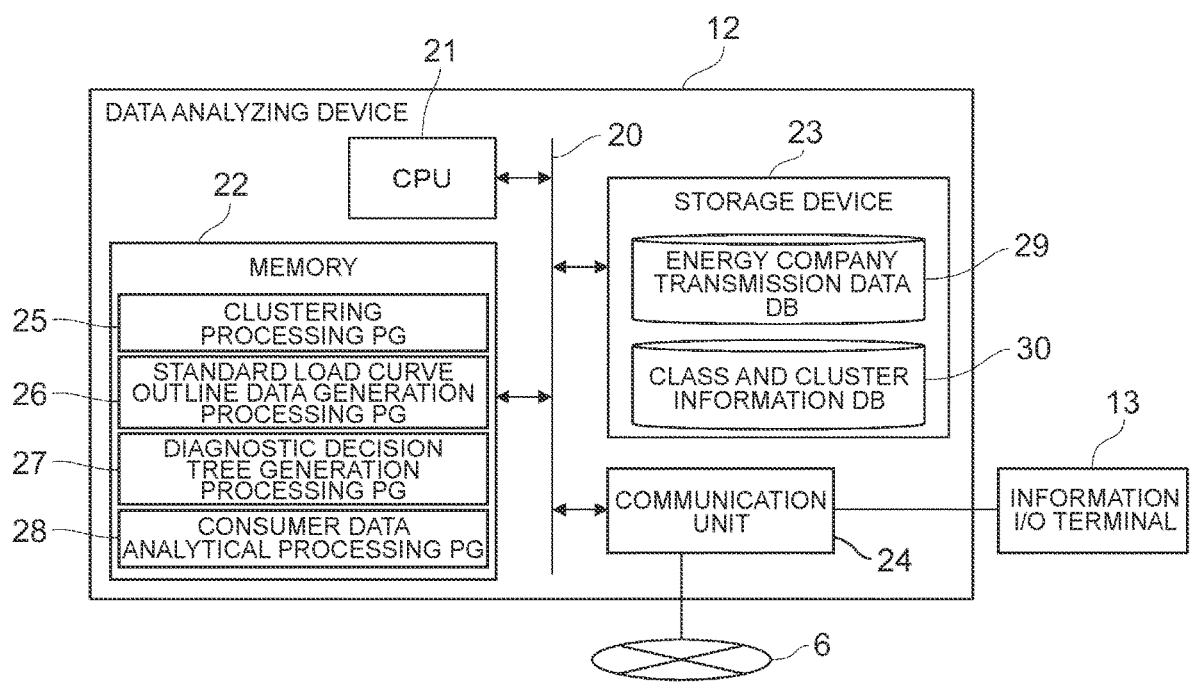
FIG. 2 is a block diagram showing a schematic configuration of the data analyzing device.

FIG. 2 shows a schematic configuration of the data analyzing device 12 of the analysis company. As shown in FIG. 2, the data analyzing device 12 is configured by comprising a CPU (Central Processing Unit) 21, a memory 22, a storage device 23 and a communication unit 24 which are mutually connected via an internal bus 20.

The CPU 21 is a processor that governs the operational control of the overall data analyzing device 12. Furthermore, the memory 22 is primarily used for temporarily storing various programs and data. The clustering processing program 25, the standard load curve outline data generation processing program 26, the diagnostic decision tree generation processing program 27 and the consumer data analytical processing program 28 described later are also stored and retained in the memory 22.

The storage device 23 is configured, for instance, from a hard disk device, and is used for retaining programs and data for a long period of time. The energy company transmission data database 29 and the class and cluster information database 30 described later are stored and retained in the storage device 23.

The communication unit 24 performs protocol control during communication with the meter data collection server 3 of the energy company 2 via the network 14, or during communication with the consumer information providing server 4, the sales information processing apparatus 5, the traded product information processing apparatus 6 or the corporate information processing apparatus 7, or during communication with the information I/O terminal 13.

Figure 3:
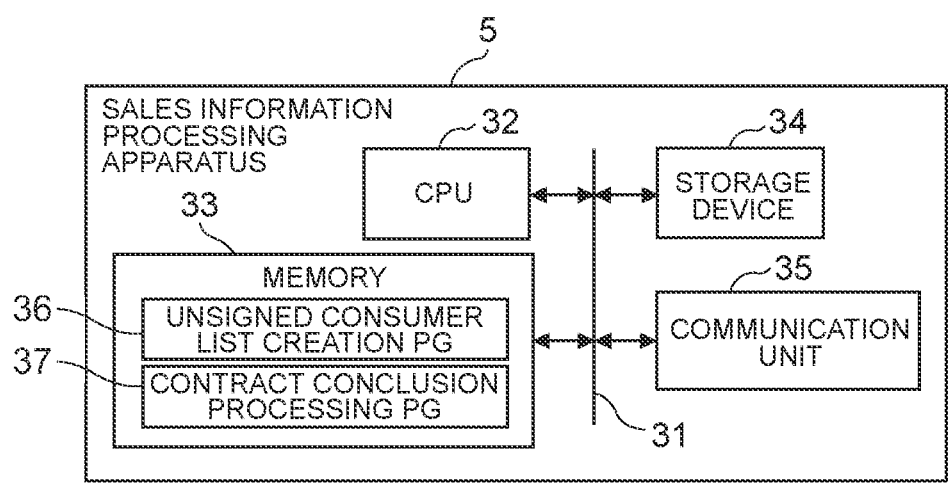
FIG. 3 is a block diagram showing a schematic configuration of the sales information processing apparatus.

Meanwhile, FIG. 3 shows a schematic configuration of the sales information processing apparatus 5 of the energy company 2. As shown in FIG. 3, the sales information processing apparatus 5 is configured by comprising a CPU 32, a memory 33, a storage device 34 and a communication unit 35 which are mutually connected via an internal bus 31. Since the CPU 32, the memory 33, the storage device 34 and the communication unit 35 have the same functions and configuration as the CPU 21, the memory 22, the storage device 23 and the communication unit 24 of the data analyzing device 12 described above with reference to FIG. 2, the detailed explanation thereof is omitted. Note that the memory 33 of the sales information processing apparatus 5 stores the unsigned consumer list creation program 36 and the contract conclusion processing program 37 described later.

(2) Flow of Data Analytical Processing in Energy Selling System

The data analyzing function equipped in the data analyzing device 12 of the analysis company 11 is now explained. In the case of this embodiment, the data analyzing device 12 is equipped with a data analyzing function of analyzing the past electrical power demand based on the load data and attribute information of each consumer 8 accumulated in the meter data collection server 3 of the energy company 2, generating information that is useful for the energy company 2 and each consumer 8, and providing the generated information to the energy company 2.

FIG. 4 shows the flow of the series of processing that is executed by the energy selling system 1 in relation to the data analyzing function. In the energy selling system 1, the equipment control terminal 9 (FIG. 1) of each consumer 8 periodically sends, to the meter data collection server 3 (FIG. 1) of the energy company 2, load data representing the power usage for each unit time (for example, 30 minutes) (SP1). Furthermore, the meter data collection server 3 periodically sends, to the data analyzing device 12 of the analysis company 11, load data of a prescribed time period (for instance, this is one year, and hereinafter referred to as the "analyzing period") among the load data of each consumer that is being stored and retained, and the attribute information of each consumer 8 (SP2).

When the data analyzing device 12 receives the load data and attribute information of each consumer 8 from the meter data collection server 3, the data analyzing device 12 executes load data clustering processing of classifying the load data into a plurality of clusters in consumer units (SP3). Consequently, each consumer 8 is also classified into a group that is associated with the cluster to which the corresponding load data belongs (this is hereinafter referred to as the "consumer class"). Furthermore, the data analyzing device 12 thereafter generates, for each cluster, outline data representing the load curve which represents the transition of the power usage in a standard analyzing period of the consumer 8 belonging to the consumer class corresponding to that cluster (this is hereinafter referred to as the "standard load curve") (SP4). Note that normalization processing in which the load data takes the values of average 0, distribution 1 may also be executed prior to the processing of the load data clustering. Consequently, it will be possible to obtain a group of consumers associated with a cluster to which load curves of similar figures belong, irrespective of the amount of power reception of the consumers. For example, it is possible to obtain a group of consumers in which the amount of power reception increased during a specific time frame during the evening.

Subsequently, the data analyzing device 12 executes consumer data analytical processing of analyzing the power usage status of each consumer 8 based on the load data and attribute information of each consumer 8 acquired in step SP2 (SP5). Specifically, the data analyzing device 12 generates, for each consumer 8, outline data of the load curve representing the transition of the power usage within the analyzing period, and sends the generated outline data, as the estimated value of the future power usage of the corresponding consumer 8, to the consumer information providing server 4 of the energy company 2. Furthermore, the data analyzing device 12 determines the recommended rate menu and equipment for each consumer 8 and executes other analytical processing based on the generated outline data of the load curve within the analyzing period for each consumer 8, and sends the decision result and analysis result thereof to the consumer information providing server 4 of the energy company 2.

Here, the data analyzing device 12 calculates, for each consumer 8 based on the load data and attribute information of each consumer 8 acquired in step SP2, supplementary information such as the total power usage within the analyzing period, the power usage during the tightening of electric power supply of the energy company 2 such as in times of a planned power outage, and increase in the power consumption relative to the temperature, and stores the supplementary information calculated for each consumer 8 as statistical information in the class attribute information table 30B (FIG. 7) described later with reference to FIG. 7.

Figure 14:
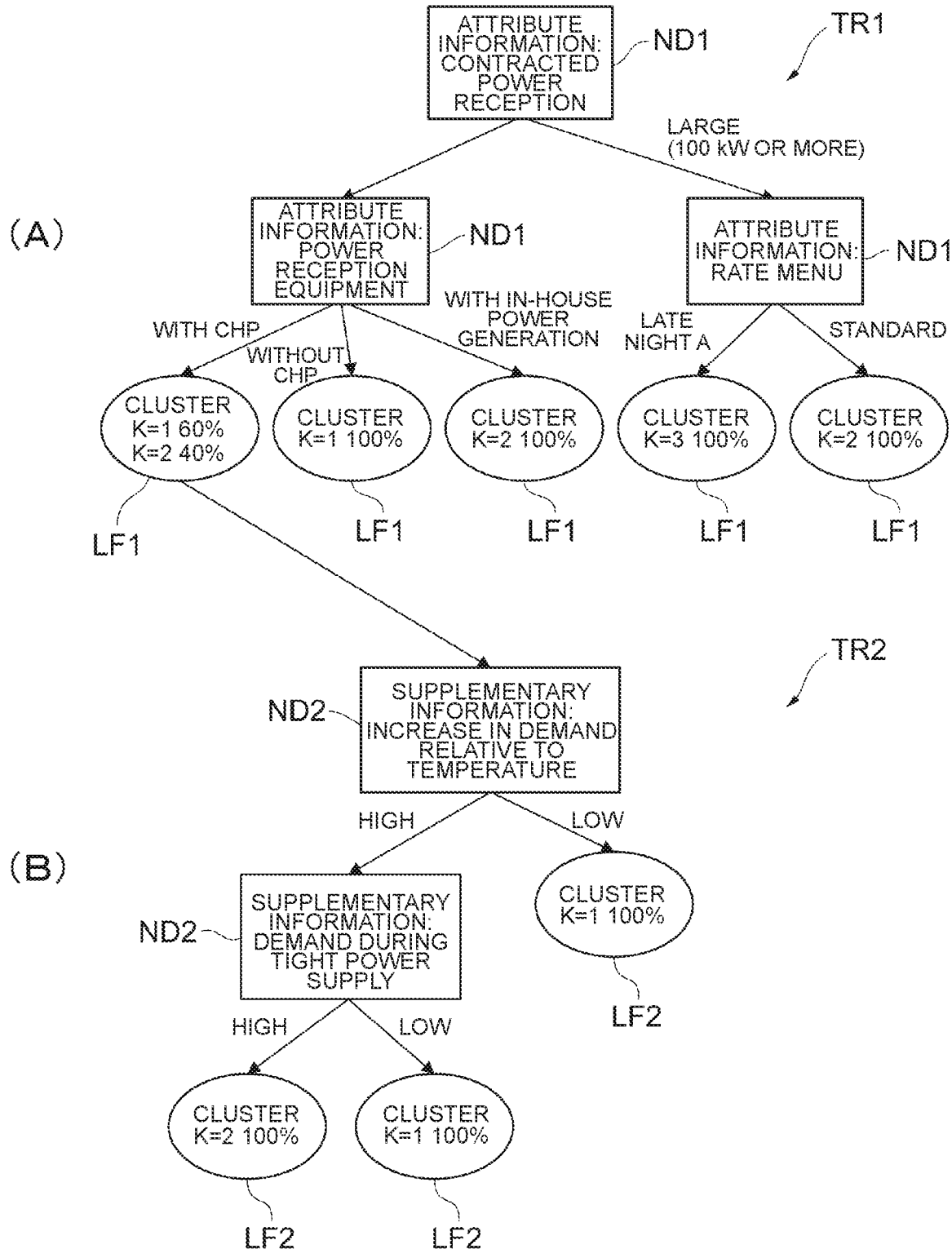
FIG. 14(A) and FIG. 14(B) is a conceptual diagram showing a schematic configuration of the diagnostic decision tree.

Subsequently, the data analyzing device 12 generates, based on the attribute information for each consumer 8 acquired in step SP2 and the processing result of the load data clustering processing of step SP3, a diagnostic decision tree as shown in FIG. 14 for classifying new consumers 8 from which load data has not yet been acquired and existing consumers 8 from which load data cannot be acquired since an equipment control terminal 9 (FIG. 1) has not been installed (these consumers 8 are hereinafter collectively referred to as the "new consumers 8") into one of the consumer classes (SP6). Note that, in the case of this embodiment, ID 3 (Iterative Dichotomiser 3) is used as the algorithm for creating the diagnostic decision tree as described above, but an algorithm other than ID 3 may also be used. Details regarding the diagnostic decision tree will be described later.

Meanwhile, when the data analyzing device 12 subsequently receives the attribute information of the new consumers 8 from the meter data collection server 3 (SP7), the data analyzing device 12 uses the diagnostic decision tree created in step SP6 to make a diagnosis regarding to which consumer class the new consumer 8 belongs (more accurately, estimates to which cluster the load data of the new consumer 8 belongs) (SP8).

Subsequently, the data analyzing device 12 sends, to the consumer information providing server 4 of the energy company 2, the outline data of the foregoing standard load curve corresponding to the consumer class diagnosed as being the consumer class to which that new consumer 8 belongs as the estimation result of the future power usage of that new consumer 8. Furthermore, the data analyzing device 12 determines the rate menu and equipment recommended to that new consumer 8 and executes other analytical processing based on the outline data of the standard load curve, and sends the decision result and analysis result thereof to the consumer information providing server 4 of the energy company 2. Furthermore, the data analyzing device 12 estimates the supplementary information of that new consumer 8, and stores the estimated supplementary information as statistical information in the class attribute information table 30B (FIG. 7) described later (SP9).

Consequently, when the existing or new consumer 8 thereafter uses one's own information I/O terminal 10 (FIG. 1) and accesses the consumer information providing server 4 of the energy company 2 and requests the provision of information related to that consumer 8 (SP10), the consumer information providing server 4 of the energy company 2 displays the load curve obtained based on the outline data of the standard load curve of that consumer 8, which was provided by the data analyzing device 12 in step SP5 or step SP9, as the estimation result of the future power usage, and provides information such as the recommended rate menu and equipment determined by the data analyzing device 12 to that consumer 8 (SP11).

Meanwhile, if the consumer 8 who acquired information such as the recommended rate menu and equipment in step SP11 requests, for instance, the conclusion of a contract for the recommended rate menu based on the acquired information, or the new consumer 8 that has not yet concluded a contract with the energy company 2 operates one's own information I/O terminal and applies for the conclusion of a new energy sales contract with the energy company 2, such request is sent from that information I/O terminal to the sales information processing apparatus 5 of the energy company 2 (SP12).

Subsequently, in response to the received request, the sales information processing apparatus 5 of the energy company 2 executes processing for concluding a new energy sales contract based on the requested rate menu regarding existing consumers 8, and executes processing required for concluding the requested energy sales contract regarding new consumers 8 who have not yet concluded a contract (SP13).

As means for the data analyzing device 12 to execute the processing of step SP3 to step SP6, step SP8 and step SP9 based on the data analyzing function described above, the memory 22 (FIG. 2) of the data analyzing device 12 stores, as shown in FIG. 2, a clustering processing program 25, a standard load curve outline data generation processing program 26, a diagnostic decision tree generation processing program 27 and a consumer data analytical processing program 28, and the storage device 23 of the data analyzing device 12 stores an energy company transmission data database 29, and a class and cluster information database 30.

The clustering processing program 25 is a program with a function of classifying the load data for each consumer that is periodically sent from the meter data collection server 3 of the energy company 2 into a plurality of clusters in consumer units. Furthermore, the standard load curve outline data generation processing program 26 is a program with a function of generating the outline data of the standard load curve of each cluster based on the processing result of the clustering processing program 25, and the diagnostic decision tree generation processing program 27 is a program with a function of generating the foregoing diagnostic decision tree (FIG. 14) based on the processing result of the clustering processing program 25.

Furthermore, the consumer data analytical processing program 28 is a program with a function of determining the future power usage and the recommended rate menu and equipment of the existing consumers based on the load data and attribute information of those existing consumers 8 which are periodically provided by the meter data collection server 3 of the energy company 2, determining the consumer class of new consumers 8 based on the diagnostic decision tree generated by the diagnostic decision tree generation processing program 27, and determining the future power usage and the recommended rate menu and equipment of those new consumers 8.

Meanwhile, the energy company transmission data database 29 is a database that is used for storing and retaining the load data and attribute information of each consumer 8 which are provided by the meter data collection server 3 of the energy company 2. The energy company transmission data database 29 takes on a table configuration configured from a consumer ID column 29A, an item column 29B and a value column 29C as shown in FIG. 5.

Moreover, the consumer ID column 29A stores the identification number of each consumer 8, and the item column 29B stores the item name of the load data and attribute information of the corresponding consumer 8 ("load data" with regard to "load data", and "monthly integral power usage", "location (geography)" and "rate menu" with regard to attribute information). Furthermore, the value column stores the value of the corresponding item of the corresponding consumer.

Accordingly, in the case of FIG. 5, with regard to the consumer 8 having an identification number of "1", the power usage ("load data") for each unit time is "100.0 kW, 150 kW, ...", the monthly integral power usage is "10,000 kWh, 14,000 kWh, ...", latitude and north latitude are located at the positions of "A+30.0, B+130.0" (A, B are predetermined constants), the current rate menu is "late night discount type A", the system feeder number is "101", the contracted power reception per hour is "500 kW", "CHP: 10 kW" is owned as the equipment, the cluster number of the cluster of the load data classified based on the foregoing clustering is "170", and the consumer's own consumer class is "70".

Moreover, the class and cluster information database 30 (FIG. 2) is configured from the cluster attribute information table 30A shown in FIG. 6 and the class attribute information table 30B shown in FIG. 7.

Among the above, the cluster attribute information table 30A is a table that is used for managing the respective clusters obtained by performing clustering processing to the load data of the respective consumers 8 in step SP3 of FIG. 4, and is configured, as shown in FIG. 6, from a cluster ID column 30AA, an item column 30AB and a value column 30AC.

The cluster ID column 30AA stores the identification number that is assigned to each cluster obtained based on the clustering processing, and the item column 30AB stores the item name of each piece of information related to the corresponding cluster ("number of sample consumers", "sample consumer ID list", "cluster center", "total power share" and "total consumption share"). Furthermore, the value column 30AC stores the value of the corresponding item of the corresponding consumer 8.

Accordingly, in the case of FIG. 6, with regard to the cluster assigned with the identification number of "1", the number of consumers belonging to that cluster is "4000", the ID of those consumers 8 is "1, 2, 4, ..., 5780", the coordinates of the cluster center of that cluster are "[0, 100, 100, 0, 0, 200, ..., 0]", the ratio of the total contracted power reception of the respective consumers 8 belonging to that cluster relative to the total contracted power reception of all consumers 8 is "10%", and the ratio of the total power consumption of the respective consumers 8 belonging to that cluster relative to the total power consumption of all consumers 8 is "10%".

Moreover, the class attribute information table 30B is a table that is used for managing the respective consumer classes to which the consumers 8 were distributed, and is configured, as shown in FIG. 7, from a class ID column 30BA, an item column 30BB and a value column 30BC.

The class ID column 30BA stores the identification number assigned to each consumer class, and the item column 30BB stores the item name of each piece of information related to the corresponding consumer class ("standard load curve", "cluster number list", "consumer ID list", "statistical information list" and "valid energy saving investment list"). Furthermore, the value column 30BC stores the value of the corresponding item of the corresponding consumer class.

Accordingly, in the case of FIG. 7, with regard to the consumer class assigned with the identification number of "1", the identification number of the corresponding cluster is "1", and the standard load curve of that consumer class is shown as the product of performing inverse Fourier transformation to the cluster center "[0, 100, 100, 0, 0, 200, ..., 0]" of the corresponding cluster. Furthermore, in FIG. 7, the consumer 8 having an ID of "4" is the only consumer belonging to that consumer class, and, as the overall statistical information (supplementary information) of that consumer 8 belonging to that consumer class which was obtained by analyzing the load data of that consumer 8, the total power usage is "1000" MW, the power usage during the tightening of electric power supply of the energy company 2 such as in times of a planned power outage is "5000" MW, the increase in power usage relative to the temperature is "500" MW, the equipment recommended to the consumer 8 belonging to that consumer class is "CHP (Combined Heat Power)" of "100 kW", and the recommended rate menu is "nighttime contract A". Note that the statistical information (supplementary information) regarding the consumer class assigned with an identification number is not limited to the information described above, and information related to the increase in the power usage relative to the various diffusion indexes such as the final demand inventory index, new openings, unemployment rate, and corporate tax revenue.

(3) Various Types of Processing Related to Data Analyzing Function

The specific processing contents of the various types of processing to be executed by the data analyzing device 12 of the analysis company 11 and the sales information processing apparatus 5 of the energy company 2 in relation to the foregoing data analyzing function are now explained. Note that, in the ensuing explanation, while the processing entity of the various types of processing is explained as a "program" as needed, in effect, it goes without saying that the CPU 21 (FIG. 2) of the data analyzing device 12 and the CPU 32 (FIG. 3) of the sales information processing apparatus 5 executes the processing based on the "program".

(3-1) Load Data Clustering Processing

Figure 8:
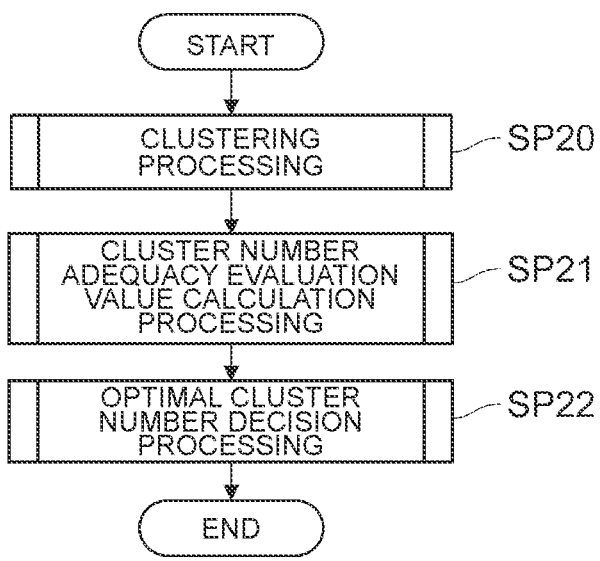
FIG. 8 is a flowchart showing a processing routine of the load data clustering processing.

FIG. 8 shows the specific processing contents of the processing that is executed by the data analyzing device 12 of the analysis company 11 in step SP3 of the series of processing described above with reference to FIG. 4 (this processing is hereinafter referred to as the "load data clustering processing"). The load data clustering processing is processing for classifying the respective consumers 8 into several clusters in which the feature quantity, such as the outline of the load data, is substantially similar, and calculating the cluster center as information representing the respective clusters.

When the data analyzing device 12 receives the load data and attribute information of each consumer 8 from the meter data collection server 3 of the energy company 2, the data analyzing device 12 starts the load data clustering processing shown in FIG. 8, and foremost obtains a obtains a cluster center set $\{C_k; k=1, 2, \ldots, N\}$ of each cluster when the acquired load data is classified into 1 to M (M is number of consumers 8) clusters in consumer units (SP20).

Specifically, based on k-means clustering, the data analyzing device 12 distributes the load data to the respective clusters while sequentially changing the cluster number N from 1 to M and obtains the cluster center set $\{C_k\}$ of each cluster at such point in time; for instance, cluster center set $\{C_1\}$ of that cluster when the load data is classified into one cluster in consumer units, cluster center set $\{C_1, C_2\}$ of each cluster when the load data is classified into two clusters in consumer units, cluster center set $\{C_1, C_2, C_3\}$ of each cluster when the load data is classified into three clusters in consumer units, . . . .

Next, the data analyzing device 12 executes cluster number adequacy evaluation value calculation processing of calculating the index for evaluating which cluster number N would be adequate (this index is hereinafter referred to as the "adequacy evaluation value") based on the processing result of the foregoing clustering processing (SP21). In the case of this embodiment, the data analyzing device 12 calculates, as the adequacy evaluation value, the intra-cluster relevance representing the degree of unity of the load data in each of the clusters, and the inter-cluster average degree of separation representing the degree of separation of the clusters.

Thereafter, the data analyzing device 12 decides the optimal cluster number based on the intra-cluster relevance and the inter-cluster average degree of separation calculated in step SP21 (SP22).

Based on the foregoing processing, the load data of each consumer 8 is classified into the cluster of an appropriate cluster number in consumer units, and consequently each consumer 8 is also classified into the consumer class of an appropriate class number.

(3-1-1) Clustering Processing

Figure 9:
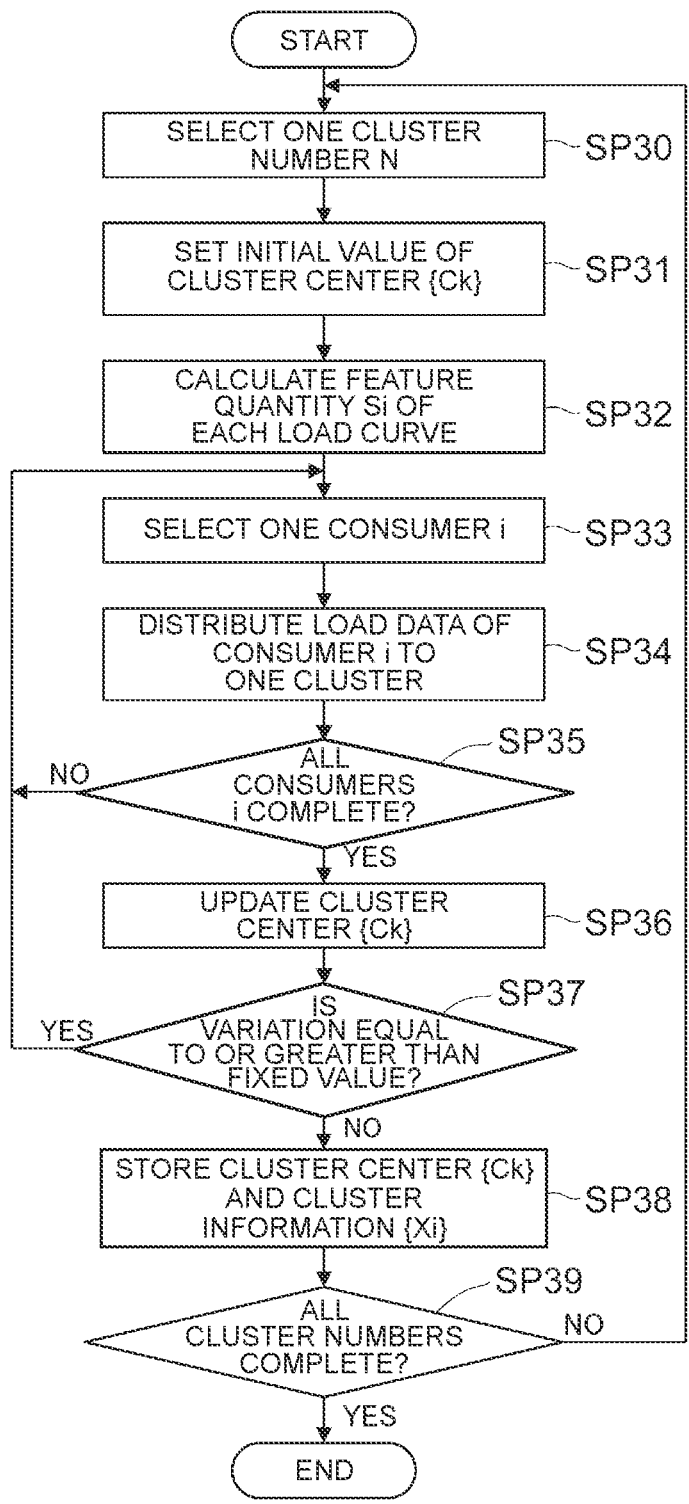
FIG. 9 is a flowchart showing a processing routine of the clustering processing.

FIG. 9 shows the specific processing contents of the clustering processing to be executed in step SP20 of the load data clustering processing described above with reference to FIG. 8. The clustering processing is executed by the clustering processing program 25 (FIG. 2).

In effect, when the clustering processing program 25 receives the load data and attribute data for the analyzing period of each consumer 8 from the meter data collection server 3 (FIG. 1) of the energy company 2, the clustering processing program 25 starts the clustering processing shown in FIG. 9, and foremost assumes the cluster number N {N=1, 2, . . . , M (M is number of all consumers)} of the consumer 8 to be one among 1 to M (SP30), and sets the initial value of the cluster center set $\{C_k: k=1, 2, \ldots, N\}$ of each cluster at that point in time (SP31). The initial value may be any value and, for instance, the execution result of the previous clustering processing may be used.

Next, the clustering processing program 25 calculates the feature quantity $S_i$ $\{s_{i,1}, s_{i,2}, \ldots s_{i,t}\}$ of the load data for the analyzing period of each consumer i $\{i=1, 2, \ldots, M\}$ (SP32). In this embodiment, since load data is clustered from the daily, weekly and annual electrical power demand periodicity, the result of performing Fourier transformation to the load data for the analyzing period of each consumer i is used as the feature quantity $S_i$ of that consumer i. Moreover, the foregoing feature quantity may be information other than the result of performing Fourier transformation so as long as it is information which indicates the features of the load data of each consumer i; for instance, the foregoing feature quantity may be the time series data of the load data, or statistical information of the load data such as the average value (average demand) or the maximum value (maximum demand) of the load data.

Next, the clustering processing program 25 selects one unprocessed consumer i among the respective consumers i for which the load data was received (SP33). The clustering processing program 25 subsequently calculates, with regard to that consumer i, the Euclidean distance of the cluster center set $\{C_k\}$ of each cluster set in step SP31 and the feature quantity $S_i$ of the load data of that consumer i acquired in step SP32, and distributes the load data of that consumer i to the cluster set $X_k$ of the nearest cluster (SP34).

Next, the clustering processing program 25 determines whether the processing of step SP34 has been executed for all consumers i (SP35), and returns to step SP33 upon obtaining a negative result. The clustering processing program 25 thereafter repeats the processing of step SP33 to step SP35 while sequentially switching the consumer i selected in step SP33 to another unprocessed consumer i.

When the clustering processing program 25 eventually completes distributing the load data of each consumer i to the cluster set $\{X_k\}$ of one of the clusters (SP35: YES), the clustering processing program 25 updates the cluster center set $\{C_k\}$ of each cluster to the average value $S_{k\_ave}=\{\Sigma_i s_{j,1}/M, \Sigma_i s_{i,2}/M, \Sigma_i s_{i,3}/M, \ldots \}$ (provided i∈$X_k$) of the feature quantity in the set of the consumer i belonging to the corresponding cluster (this is hereinafter referred to as the "cluster set") $\{X_k\}$ (SP36).

Thereafter, the clustering processing program 25 determines whether the variation in step SP36 of the cluster center set $\{C_k\}$ of at least one cluster is equal to or not less than a predetermined threshold (SP37). When the clustering processing program 25 obtains a positive result in this determination, the clustering processing program 25 returns to step SP33 and thereafter repeats step SP33 to step SP37.

When the variation of the cluster center $C_k$ of all clusters eventually becomes less than the threshold (SP37: YES), the clustering processing program 25 stores the cluster center set $\{C_k\}$ of each cluster and the cluster set $\{X_k\}$ of each cluster at that point in time memory 22 (FIG. 2) (SP38).

Subsequently, the clustering processing program 25 determines whether the processing of step SP31 to step SP38 has been executed for all cluster numbers N (SP39). When the clustering processing program 25 obtains a negative result in this determination, the clustering processing program 25 thereafter repeats the processing of step SP30 to step SP39 while changing the cluster number N selected in step SP30 to another unprocessed value (1 to M).

When the clustering processing program 25 eventually completes acquiring the cluster center set $\{C_k\}$ and the cluster set $\{X_i\}$ of the individual clusters in cases of assuming that the cluster number is respectively 1 to M (SP39: YES), the clustering processing program 25 ends the clustering processing.

(3-1-2) Cluster Number Adequacy Evaluation Value Calculation Processing

Figure 10:
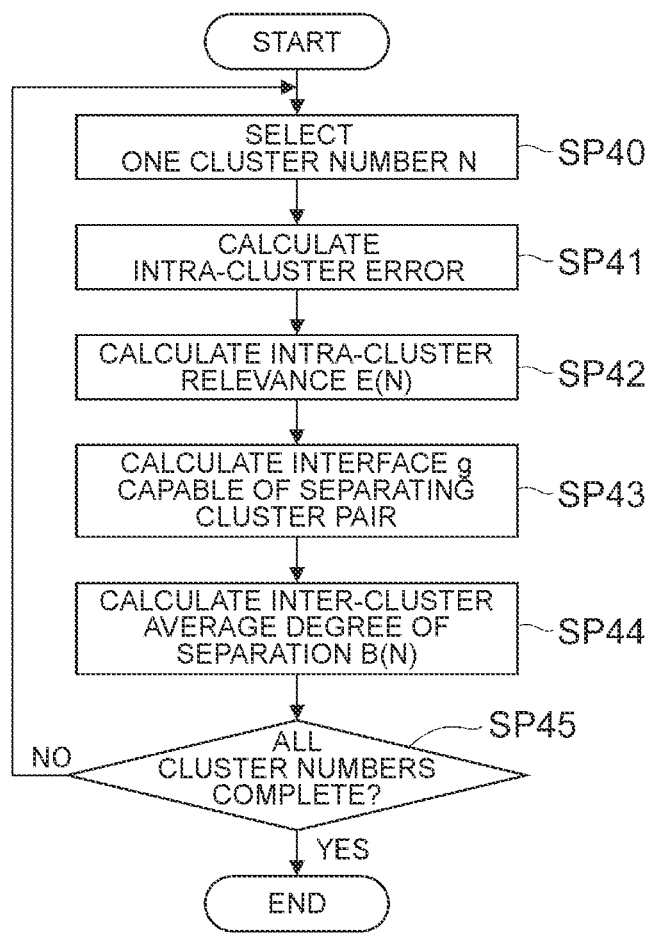
FIG. 10 is a flowchart showing a processing routine of the cluster number adequacy evaluation value calculation processing.

FIG. 10 shows the specific processing contents of the cluster number adequacy evaluation value calculation processing to be executed in step SP21 of the load data clustering processing described above with reference to FIG. 8. The cluster number adequacy evaluation value calculation processing is executed by the clustering processing program 25. The cluster number adequacy evaluation value calculation processing is processing for deciding the cluster number by evaluating the results of clustering of the respective cluster numbers 1 to M calculated in the foregoing load data clustering processing based on a plurality of distance indexes such as the distance between the load data and the cluster center and the distance between the respective clusters.

In effect, when the clustering processing program 25 completes the clustering processing described above with reference to FIG. 9, the clustering processing program 25 starts the cluster number adequacy evaluation value calculation processing shown in FIG. 10, and foremost selects one among 1 to M (M is number of all consumers) as the cluster number N (SP40), and calculates, for each cluster, an error (this error is hereinafter referred to as the "intra-cluster error") $E_k$ between the feature quantity $S_i$ of each load data belonging to that cluster and the cluster center $C_k$ of that cluster in cases of assuming that the cluster number N is the number selected in step SP40 (SP41). Specifically, the clustering processing program 25 calculates the intra-cluster error of one cluster as the total value of the distance between the feature quantity $S_i$ of the individual load data belonging to that cluster and the cluster center $C_k$ of that cluster.

Subsequently, the clustering processing program 25 calculates, based on the intra-cluster error $E_N$ calculated in step SP41, the intra-cluster relevance E(N) for each cluster based on the following formula with the penalty coefficient for inhibiting an excessively large cluster number as a, and the feature quantity dimension number as D (SP42).

[Math 1]

$$E(N)=1/(E_N+a\times N\times D) \quad (1)$$

The intra-cluster relevance E(N) is an index representing the degree of unity of the individual load data in the clusters as described above, and as the intra-cluster relevance E(N) is larger, the load data in that cluster is in a unified state. Moreover, in k-means clustering, as the cluster number N is larger the $E_N$ will be smaller, and becomes smallest when N=M (number of consumers). Therefore, a penalty term a×N×D which is proportional to the number of parameters in the k-means clustering is added.

Next, the clustering processing program 25 calculates an interface g where the clusters can be separated by using a multi class support vector machine (SP43), and thereafter calculates the inter-cluster average degree of separation B(N) based on the following formula with the total value of the margin (distance) between the respective clusters as $M_N$ (SP44).

[Math 2]

$$B(N)=M_N I_N C_2 \quad (2)$$

The inter-cluster average degree of separation B(N) is an index representing the degree of separation of the clusters as described above, and as the inter-cluster average degree of separation B(N) is larger, the clusters are more separated. Moreover, the inter-cluster average degree of separation may be any index so as long as it is an index which will increase as the average distance between the respective clusters is larger, and the average value of the distance between the respective cluster center sets $\{C_k\}$ may also be used as the index.

Thereafter, the clustering processing program 25 determines whether the calculation of the intra-cluster relevance E(N) and the inter-cluster average degree of separation B(N) regarding all cluster numbers N (1 to M) is complete (SP45). When the clustering processing program 25 obtains a negative result in this determination, the clustering processing program 25 thereafter repeats the processing of step SP40 to step SP45 while changing the cluster number N selected in step SP40 to another unprocessed value (1 to M).

When the clustering processing program 25 eventually completes the calculation of the intra-cluster relevance E(N) and the inter-cluster average degree of separation B(N) regarding all cluster numbers N (1 to M) (SP45: YES), the clustering processing program 25 ends the cluster number adequacy evaluation value calculation processing.

(3-1-3) Optimal Cluster Number Decision Processing

Figure 11:
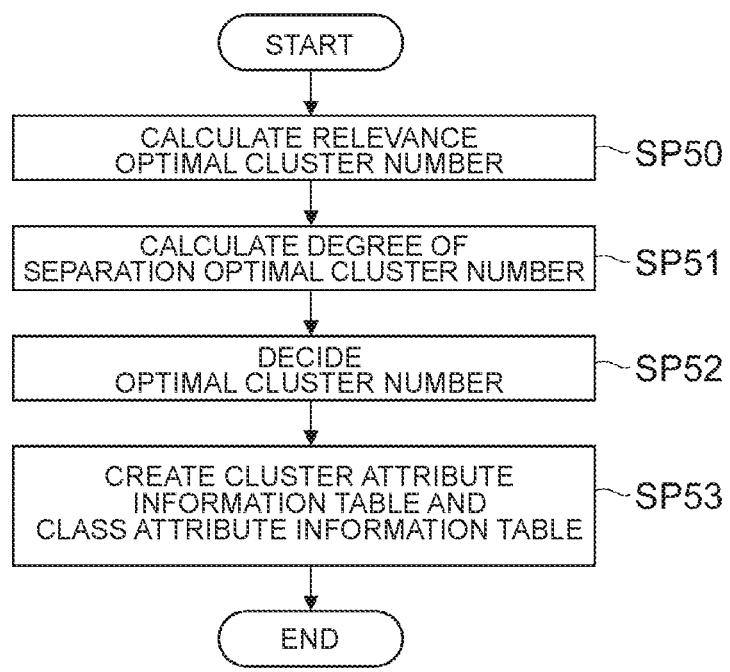
FIG. 11 is a flowchart showing a processing routine of the optimal cluster number decision processing.

FIG. 11 shows the specific processing contents of the optimal cluster number decision processing to be executed in step SP22 of the load data clustering processing described above with reference to FIG. 8. The optimal cluster number decision processing is also executed by the clustering processing program 25.

In effect, when the clustering processing program 25 ends the cluster number adequacy evaluation value calculation processing described above with reference to FIG. 10, the clustering processing program 25 starts the optimal cluster number decision processing shown in FIG. 11, and foremost calculates, as a relevance optimal cluster number CL1, a minimum cluster number in which the ratio of the variation of the intra-cluster relevance E(N) relative to the variation of the cluster number becomes equal to or not greater than a predetermined first threshold as shown in FIG. 12B based on the value of each intra-cluster relevance E(N) in cases of assuming the cluster number N calculated in the cluster number adequacy evaluation value calculation processing to be 1 to M (SP50).

Next, the clustering processing program 25 calculates, as a degree of separation optimal cluster number CL2, a minimum cluster number in which the ratio of the variation of the inter-cluster average degree of separation B(N) relative to the variation of the cluster number becomes equal to or not greater than a predetermined second threshold as shown in FIG. 12A based on the value of each inter-cluster average degree of separation B(N) in cases of assuming the cluster number N calculated in the cluster number adequacy evaluation value calculation processing to be 1 to M (SP51).

Here, if a value that is smaller than both the relevance optimal cluster number CL1 and the degree of separation optimal cluster number CL2 is decided as the current cluster number, since this means that the degree of unity of the load data in the individual clusters is small and the degree of separation of the clusters is also small, as shown in FIG. 12B, the difference between the outline of the standard load curve of each cluster and the load curve of the consumers belonging to that cluster will become too great.

Moreover, if a value that is larger than both the relevance optimal cluster number CL1 and the degree of separation optimal cluster number CL2 is decided as the current cluster number, since this means that the degree of unity of the load data in the individual clusters is small and the degree of separation of the clusters is also small, as shown in FIG. 12D, the difference in the outline of the standard load curve of the respective clusters is small and, therefore, it is difficult to extract the feature (use of electricity during daytime on weekdays, use of electricity during nighttime, or use of electricity during specific periods, etc.) of the electricity usage pattern of the consumer 8 belonging to the class corresponding to the respective clusters.

Meanwhile, if the cluster number of either the class relevance optimal cluster number CL1 or the degree of separation optimal cluster number CL2 is decided as the current cluster number, since the degree of unity of the load data in the individual clusters and the degree of separation of the clusters will be appropriate, as shown in FIG. 12C, the difference in the outline of the standard load curve of the respective clusters is appropriate and, therefore, it is easy to extract the feature of the electricity usage pattern of the consumer 8 belonging to the class corresponding to the respective clusters.

Thus, the clustering processing program 25 thereafter decides, as the current cluster number, one cluster number among the cluster numbers between the relevance optimal cluster number CL1 calculated in step SP50 and the degree of separation optimal cluster number CL2 calculated in step SP51 (SP52).

Specifically, when at least one cluster number exists between the relevance optimal cluster number CL1 and the degree of separation optimal cluster number CL2, the clustering processing program 25 decides, as the current cluster number, the cluster number that is closest to the median value thereof or a cluster number that is selected randomly therefrom. Furthermore, when no cluster number exists between the relevance optimal cluster number CL1 and the degree of separation optimal cluster number CL2, the clustering processing program 25 decides, as the current cluster number, one of either the relevance optimal cluster number CL1 or the degree of separation optimal cluster number CL2, which is selected arbitrary or determined in advance.

Next, the clustering processing program 25 creates the cluster attribute information table 30A (FIG. 6) and the class attribute information table 30B based on the decision result of step SP52 (SP53), and thereafter ends the cluster number decision processing.

(3-2) Standard Load Curve Outline Data Generation Processing

Figure 13:
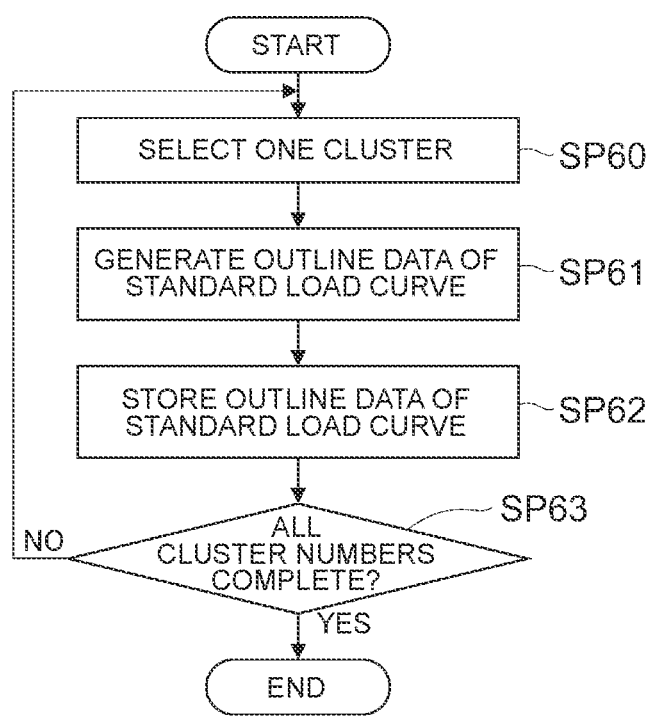
FIG. 13 is a flowchart showing a processing routine of the standard load curve outline data generation processing.

FIG. 13 shows the specific processing contents of the standard load curve outline data generation processing to be executed by the data analyzing device 12 in step SP4 of the series of processing described above with reference to FIG. 4. The standard load curve outline data generation processing is executed by the standard load curve outline data generation processing program 26 (FIG. 2).

In effect, when the clustering processing program 25 ends the load data clustering processing described above with reference to FIG. 8 to FIG. 12, the standard load curve outline data generation processing program 26 starts the standard load curve outline data generation processing shown in FIG. 13, and foremost selects one cluster among the respective clusters of the cluster number that was decided in the foregoing optimal cluster number decision processing (FIG. 11) (SP60).

Next, the standard load curve outline data generation processing program 26 generates the outline data of the standard load curve regarding the cluster selected in step SP60 (SP61). Specifically, the standard load curve outline data generation processing program 26 acquires the cluster center of the cluster selected in step SP60 from the cluster attribute information table 30A (FIG. 6). If necessary, the outline data of the standard load curve of that cluster can be generated by correcting the cluster center based on the error or maximum value of the load curve of the consumers 8 belonging to the cluster. The standard load curve may be corrected, for instance, when the maximum demand is required, by selecting a load curve among the load curves of the consumers belong to the cluster with a large amount of excess (error in the upward direction) from the cluster center and adding such excess to the cluster center, or adding the distribution of the load curve of the consumers belonging to the cluster as an error of the standard load curve.

Next, the standard load curve outline data generation processing program 26 stores the outline data of the standard load curve generated in step SP61 in the class attribute information table 30B (FIG. 7) (SP62), and thereafter determines whether the generation of the outline data of the standard load curve regarding all clusters is complete (SP63).

When the standard load curve outline data generation processing program 26 obtains a negative result in this determination, the standard load curve outline data generation processing program 26 thereafter repeats the processing of step SP60 to step SP63 while sequentially switching the cluster selected in step SP60 to another unprocessed cluster.

When the standard load curve outline data generation processing program 26 eventually ends the generation of the outline data of the standard load curve regarding all clusters (SP63: YES), the standard load curve outline data generation processing program 26 ends the standard load curve outline data generation processing.

(3-3) Diagnostic Decision Tree Generation Processing

FIG. 14 shows the schematic configuration of the diagnostic decision tree that is generated in step SP6 of the series of processing described above with reference to FIG. 4. The diagnostic decision tree generation processing is processing for comprehensively generating a diagnostic decision tree for estimating the cluster, to which consumers are related, from the information respectively held by the energy company and the analysis company. As shown in FIG. 14, the diagnostic decision tree is configured from a first diagnostic decision tree TR1 shown in FIG. 14(A) and a second diagnostic decision tree TR2 shown in FIG. 14(B).

Among the above, the first diagnostic decision tree TR1 is a diagnostic tree that is created based on only the load data and attribute information for the analyzing period of the respective consumers 8 provided from the meter data collection server 3 (FIG. 1) of the energy company 2 to the data analyzing device 12. In effect, with the first diagnostic decision tree TR1, the contents of each node ND1 are limited to those related to the power usage status of the consumers 8 or the attribution information of the consumers 8 that are recognized based on the load data, and the consumers 8 are associated with one of the clusters based on only the attribute information of the consumers 8.

Furthermore, the second diagnostic decision tree TR2 is a diagnostic tree that is created based on the supplementary information of the consumers 8 (attribute information of the consumer class to which the consumers 8 belong) obtained by analyzing the load data for the analyzing period of the existing consumers 8, which is distributed to a leaf LF1, with the leaf LF1 among the respective leaves LF1 of the first diagnostic decision tree TR1 in which the cluster of the distribution destination has not been identified (cluster of the distribution destination has not been decided as a single cluster) as the route. In effect, with the second diagnostic decision tree TR2, the contents of each node ND2 are limited to those related only to the supplementation information of the consumers 8, and the consumers 8 are associated with one of the clusters based on only the foregoing supplementary information.

Figure 15:
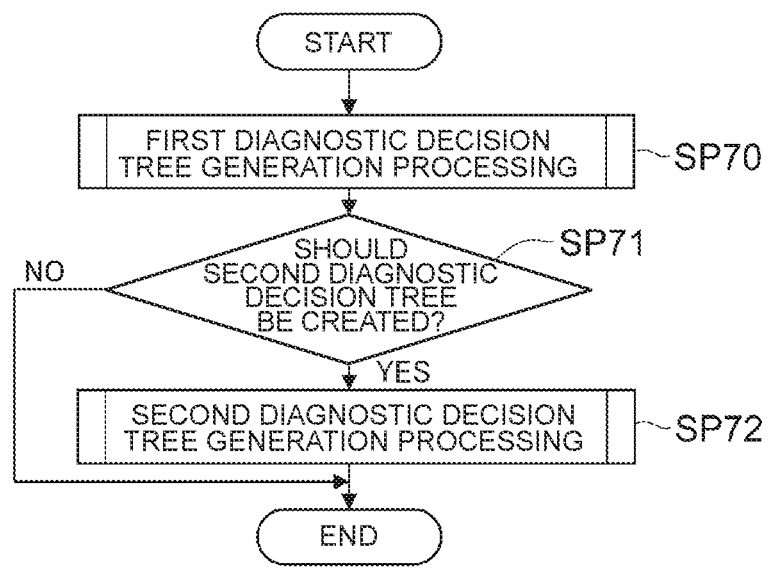
FIG. 15 is a flowchart showing a processing routine of the diagnostic decision tree generation processing.

FIG. 15 shows the specific processing contents of the diagnostic decision tree generation processing to be executed in step SP6 of the series of processing described above with reference to FIG. 4 for creating the first and second diagnostic decision trees TR1, TR2 described above. The diagnostic decision tree generation processing is executed by the diagnostic decision tree generation processing program 27 (FIG. 2).

In effect, when the diagnostic decision tree generation processing program 27 proceeds to step SP6 of the series of processing described above with reference to FIG. 4, the diagnostic decision tree generation processing program 27 starts the diagnostic decision tree generation processing shown in FIG. 15, and foremost refers to the energy company transmission data database 29 (FIG. 5) and the cluster attribute information table 30A (FIG. 6), and generates the first diagnostic decision tree TR1 (SP70).

Next, the diagnostic decision tree generation processing program 27 determines whether there is a leaf LF1 in the first diagnostic decision tree TR1 in which the cluster of the distribution destination has not been decided as a single cluster (SP71). When the diagnostic decision tree generation processing program 27 obtains a negative result in this determination, the diagnostic decision tree generation processing program 27 ends the diagnostic decision tree generation processing.

Meanwhile, when the diagnostic decision tree generation processing program 27 obtains a positive result in the determination of step SP71, the diagnostic decision tree generation processing program 27 refers to the class attribute information table 30B and generates the second diagnostic decision tree TR2 (SP72), and thereafter ends the diagnostic tree decision processing.

Figure 16:
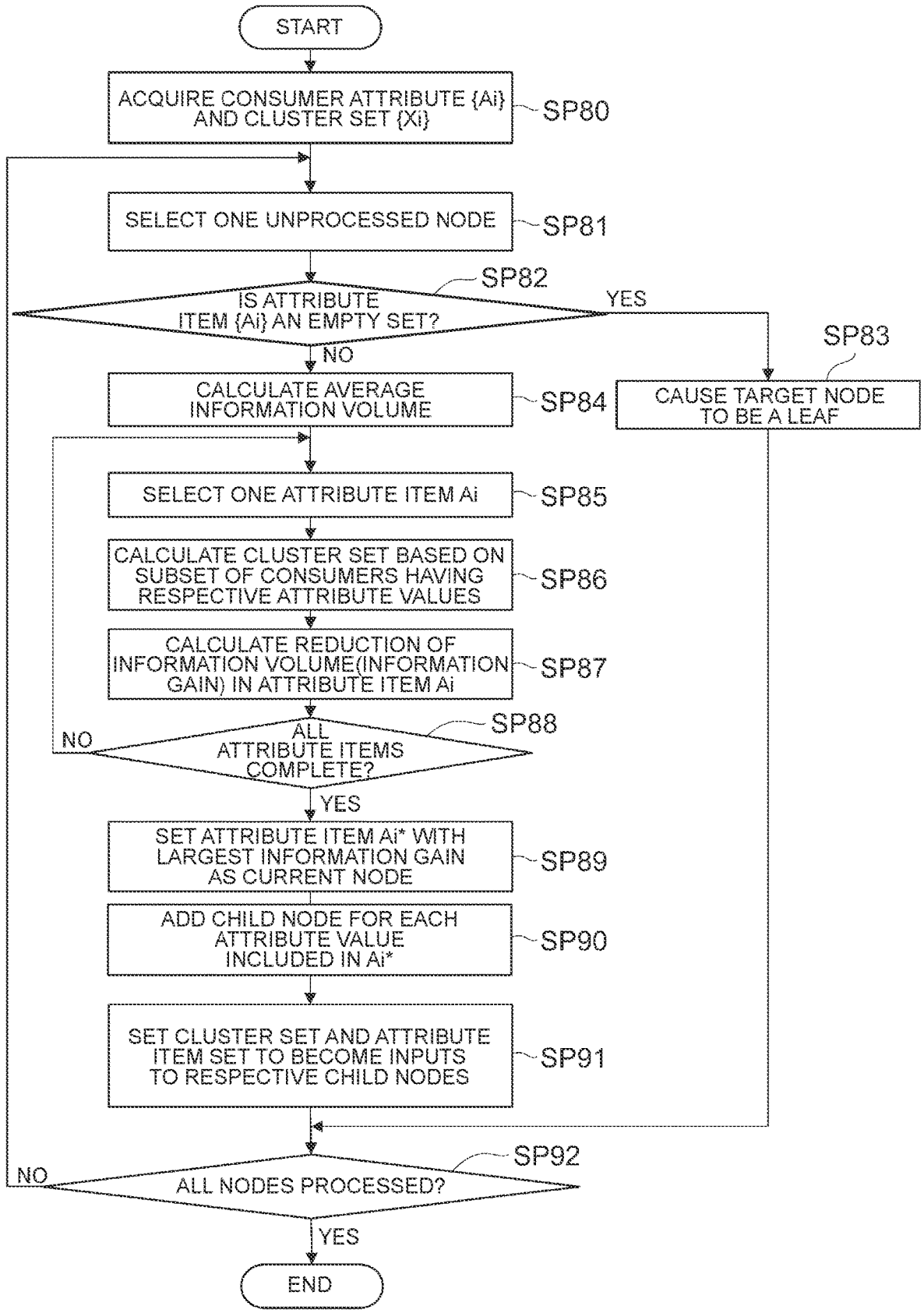
FIG. 16 is a flowchart showing a processing routine of the first diagnostic decision tree generation processing.

FIG. 16 shows the specific processing contents of the diagnostic decision tree generation processing program 27 in step SP70 of the diagnostic tree decision processing (FIG.

15). When the diagnostic decision tree generation processing program 27 proceeds to step SP70 of the diagnostic tree decision processing, the diagnostic decision tree generation processing program 27 starts the first diagnostic decision tree creation processing shown in FIG. 16, and foremost acquires the cluster information $\{X_k\}$ decided in the foregoing clustering processing and the optimal cluster number decision processing, and the attribute item $\{A_i\}$ of the respective consumers (SP80), and starts the processing from the route (uppermost node) of the diagnostic decision tree to be generated (SP81).

Next, the diagnostic decision tree generation processing program 27 determines whether the attribute item $\{A_i\}$ acquired in step SP80 is an empty set (SP82). When the diagnostic decision tree generation processing program 27 obtains a negative result in this determination, the diagnostic decision tree generation processing program 27 causes that node to become a leaf (terminal node) and then proceeds to step SP92 (SP83).

Meanwhile, when the diagnostic decision tree generation processing program 27 obtains a negative result in the determination of step SP82, the diagnostic decision tree generation processing program 27 calculates the average information volume H ($\{X_k\}$) of the cluster in all consumers included in the current cluster information based on the following formula (SP84).

[Math 3]

$$H(\{X_k\}) = -\sum_k \left(|X_k| \Big/ \sum_n |X_n|\right) \log\left(|X_k| \Big/ \sum_n |X_n|\right) \quad (3)$$

However, $|X_k|$ shall be the number of consumers included in the cluster k.

The average information volume H ($\{X_k\}$) of the cluster will be large when the variation in the cluster to which the input consumer 8 belongs is great and take on a large value when the deviation is great. The average information volume H ($\{X_k\}$) will be 0 when all input consumers 8 only belong to one cluster.

Next, the diagnostic decision tree generation processing program 27 selects one attribute item $A_i$ from the input attribute item $\{A_i\}$ (SP85), and calculates the cluster set $\{Y_{K,j}\}$ in the subset of the consumers 8 having the values $a_{i,1}, a_{i,2}, a_{i,3}, \ldots$ contained in the selected attribute item $A_i$ as their attribute values, and the number of consumers $|Y_{K,j}|$ thereof (SP86).

Subsequently, the diagnostic decision tree generation processing program 27 calculates the information gain IG ($A_i$) regarding the selected attribute item based on the following formula (SP87).

[Math 4]

$$IG(A_i) = H(\{X_k\}) - \sum_j \sum_k \left(|Y_{k,j}| \Big/ \sum_n |Y_{n,j}|\right) \log\left(|Y_{k,j}| \Big/ \sum_n |Y_{n,j}|\right) \quad (4)$$

Note that the information gain IG ($A_i$) is a parameter which represents to what level the variation in the cluster to which the consumers 8 belong will decrease when the consumers 8 are divided into subsets based on the attribute values $a_{i,1}, a_{i,2}, a_{i,3}, \ldots$.

Thereafter, the diagnostic decision tree generation processing program 27 determines whether the calculation of the information gain IG ($A_i$) regarding all input attribute items $\{A_i\}$ is complete (SP88), and returns to step SP85 upon obtaining a negative result. the diagnostic decision tree generation processing program 27 thereafter repeats the processing of step SP85 to step SP88.

When the diagnostic decision tree generation processing program 27 eventually obtains a positive result in step SP88 as a result of completing the calculation of the information gain IG ($A_i$) regarding all attribute items $\{A_i\}$, the diagnostic decision tree generation processing program 27 sets the attribute item $A_i^*$ with the greatest information gain IG ($A_i$) among the information gains IG ($A_i$) obtained in the foregoing processing as the current node of the diagnostic decision tree (SP89), and creates child nodes regarding each of the attribute values $a_{i,1}^*, a_{i,2}^*, a_{i,3}^*, \ldots$ of the attribute item $A_i^*$ (SP90).

Next, the diagnostic decision tree generation processing program 27 records, as the new cluster set $\{X_k\}$ of the corresponding child node, the subset $\{Y_{K,j}\}$ of the cluster regarding the consumer 8 having the attribute value $a_{i,j}^*$ among the attribute values $a_{i,1}^*, a_{i,2}^*, a_{i,3}^*, \ldots$ of the foregoing attribute item $A_i^*$. Moreover, the diagnostic decision tree generation processing program 27 records, as the new attribute set $\{A_i\}$ of each child node, the subset $\{A_i \backslash A_i^*\}$ of the attribute items excluding the attribute item $A_i^*$ in which the information gain IG ($A_i$) is greatest (SP91).

Next, the diagnostic decision tree generation processing program 27 determines whether the processing of step SP81 to step SP91 has been executed for all nodes (SP92), and, upon obtaining a negative result, thereafter repeats the processing of step SP81 to step SP92 while sequentially switching the node selected in step SP81 to another unprocessed node.

When the diagnostic decision tree generation processing program 27 obtains a positive result in step SP92 as a result of deciding the attribute item $A_i^*$ corresponding to all nodes, the diagnostic decision tree generation processing program 27 ends the first diagnostic decision tree generation processing.

Figure 17:
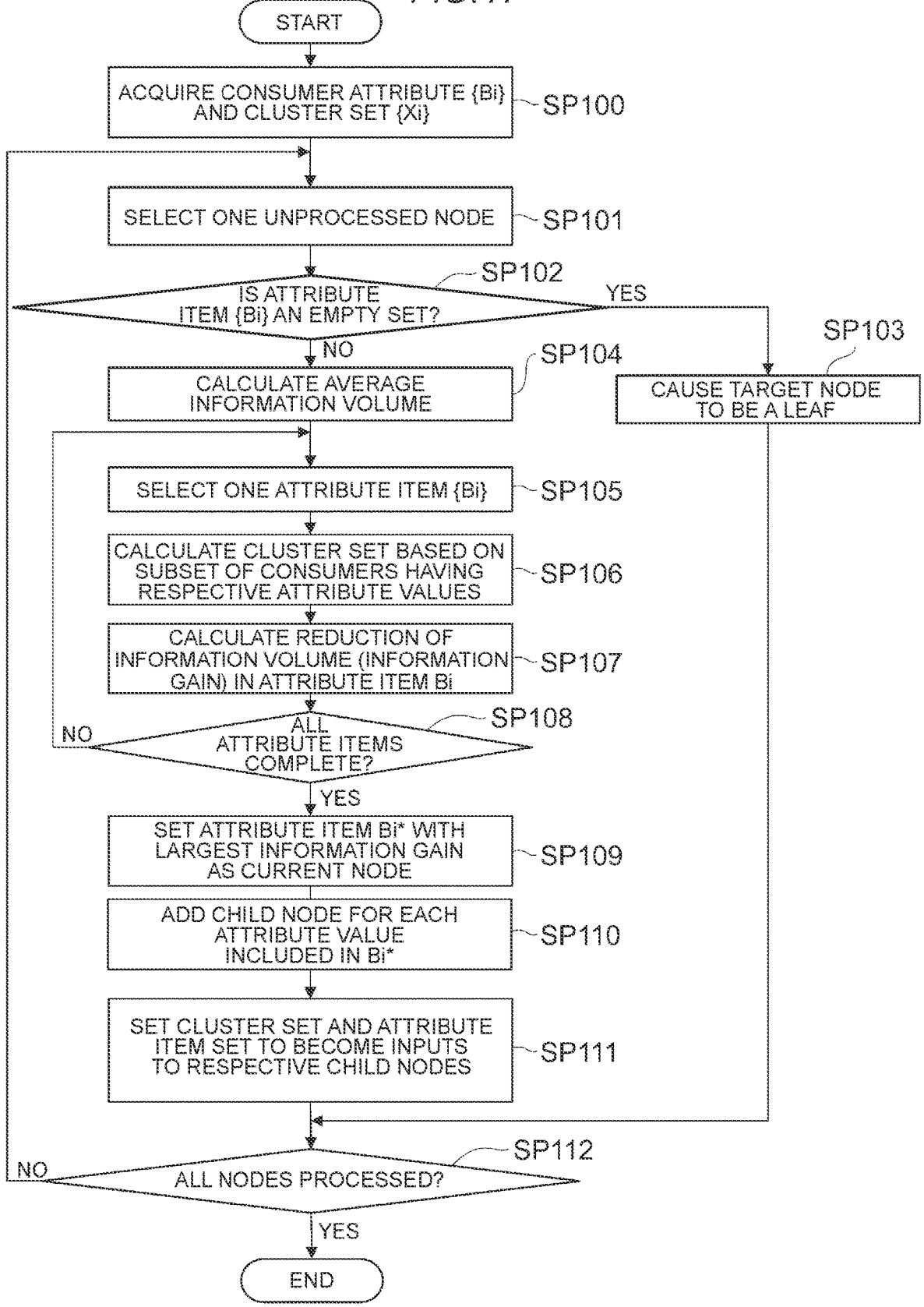
FIG. 17 is a flowchart showing a processing routine of the second diagnostic decision tree generation processing.

Meanwhile, FIG. 17 shows the specific processing contents of the diagnostic decision tree generation processing program 27 in step SP71 of the diagnostic tree decision processing (FIG. 15) described above with reference to FIG. 15. The second diagnostic decision tree generation processing shown in FIG. 17 is executed by the diagnostic decision tree generation processing program 27 upon creating the second diagnostic decision tree TR2 (FIG. 14(B)) with the supplementary information of the consumers 8 as the attribute item $\{B_i\}$ regarding the leaf LF1 among the respective leaves LF1 of the first diagnostic decision tree TR1 generated in FIG. 16 in which the cluster of the distribution destination has not been identified (cluster of the distribution destination has not been decided as a single cluster). Since the processing contents of the second diagnostic decision tree generation processing are the same as the first diagnostic decision tree generation processing described above with reference to FIG. 16 other than including the supplementary information as an input item, the detailed explanation thereof is omitted.

Note that, while the first diagnostic decision tree generation processing described above with reference to FIG. 16 and the second diagnostic decision tree generation processing described above with reference to FIG. 17 were based on ID 3, any method may be used so as long as it can generate a decision capable of diagnosing the clusters and, moreover, the generation methods of the first and second diagnostic decision trees TR1, TR2 do not need to be the same.

(3-4) Base Load Sales Contract Conclusion Processing

Figure 18:
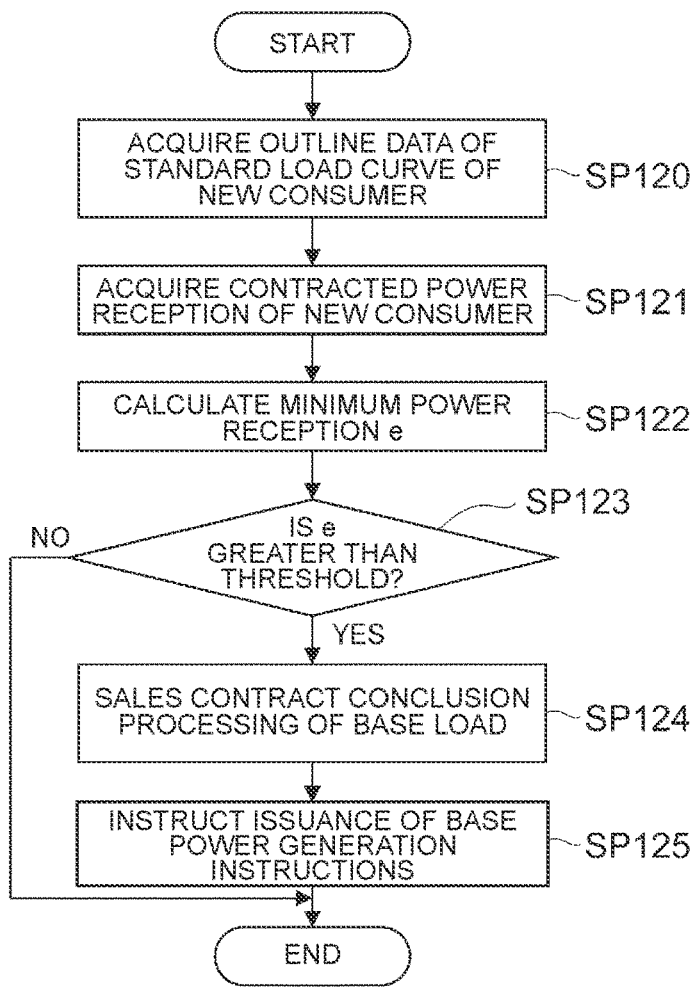
FIG. 18 is a flowchart showing a processing routine of the base load sales contract conclusion processing.
Figure 19:
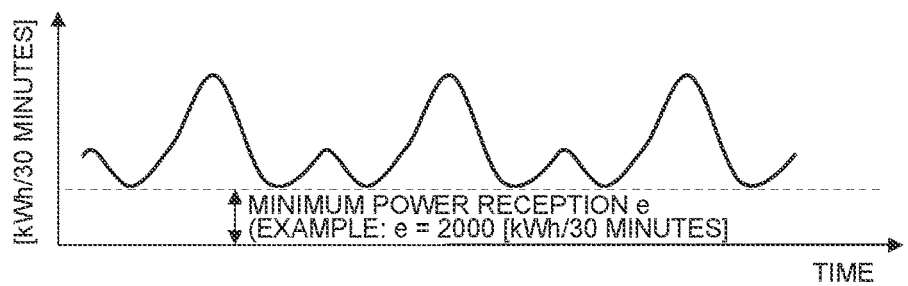
FIG. 19 is a conceptual diagram explaining the base load sales contract conclusion processing.

FIG. 18 shows the processing contents of the base load sales contract conclusion processing to be executed by the sales information processing apparatus 5 (FIG. 3) that received an application for an energy sales contract for the base load of the power consumption from an unsigned consumer (this consumer is hereinafter referred to as the "unsigned consumer") 8 in step SP13 of the series of processing described above with reference to FIG. 4. The base load sales contract conclusion processing is executed by the contract conclusion processing program 37 (FIG. 3) stored in the memory 33 of the sales information processing apparatus 5.

In effect, when the contract conclusion processing program 37 receives the application for an energy sales contract from the unsigned consumer 8 via the network 14, the contract conclusion processing program 37 starts the base load sales contract conclusion processing shown in FIG. 18, and foremost sends a request to the effect that the future power usage of the unsigned consumer 8 should be estimated to the data analyzing device 12, together with the attribute information of the unsigned consumer 8 that was input at the time of application. Consequently, in response to the foregoing request, the data analyzing device 12 uses the diagnostic decision tree described with reference to FIG. 14 and determines the estimated consumer class to which the unsigned consumer 8 belongs based on the attribute information of the unsigned consumer 8, reads the outline data of the standard load curve of that consumer class from the class attribute information table 30B (FIG. 7), and sends the read outline data to the sales information processing apparatus 5 as the outline data of the load curve representing the estimated future power usage of that unsigned consumer 8 (SP120).

Next, the contract conclusion processing program 37 estimates the amount of power reception that the unsigned consumer 8 is most likely currently receiving from another energy company based on the outline data of the load curve of the unsigned consumer 8 acquired in step SP120 (SP121), and calculates the minimum amount of power reception (this is hereinafter referred to as the "minimum power reception") e (FIG. 21) of the unsigned consumer 8 (SP122). Otherwise, the consumer may transmit the maximum power reception (kW) of a prescribed time period and the purchased electric power (kWh) of a prescribed time period for which a contract has been concluded with another energy company to the processing apparatus of the analysis company 11 and the energy company 2 via the information I/O terminal 10, or the estimation may be performed by multiplying the building area or the number of power reception equipment of the consumer by a predetermined coefficient. Consequently, even in cases where the outline data of the load curve is obtained from normalized load data, it is possible to estimate the load data of the unsigned consumer from the outline data of the load curve by using the two values of the maximum power reception and the purchased electric power of a prescribed time period, and thus calculate the minimum power reception e of that unsigned consumer.

Subsequently, the contract conclusion processing program 37 determines whether the minimum power reception e calculated in step SP122 is greater than a predetermined threshold (SP123). When the contract conclusion processing program 37 obtains a negative result in this determination, the contract conclusion processing program 37 sends a message to the effect that the energy sales contract will not be concluded to the unsigned consumer, and thereafter ends the base load sales contract conclusion processing. Accordingly, in the foregoing case, the energy sales contract is not concluded with the unsigned consumer.

Meanwhile, when the contract conclusion processing program 37 obtains a positive result in the determination of step SP123, the contract conclusion processing program 37 executes predetermined processing for concluding the energy sales contract with the unsigned consumer (SP124), instructs the traded product information processing apparatus 6 to procure the power of the minimum power reception e calculated in step SP122 (SP125), and thereafter ends the base load sales contract conclusion processing.

(4) Unsigned Consumer List Presentation Processing

The unsigned consumer list presentation processing to be executed by the energy selling system 1 separate from the series of processing described above with reference to FIG. 4 is now explained. Note that, in the ensuing explanation, let it be assumed that the data analyzing device 12 is retaining a list of all electricity consumers (this list is hereinafter referred to as the "list of all consumers") receiving electric power supply from one of the plurality of energy companies 2, and the attribute information of all registered electricity consumers is included in the list of all consumers.

Figure 20:
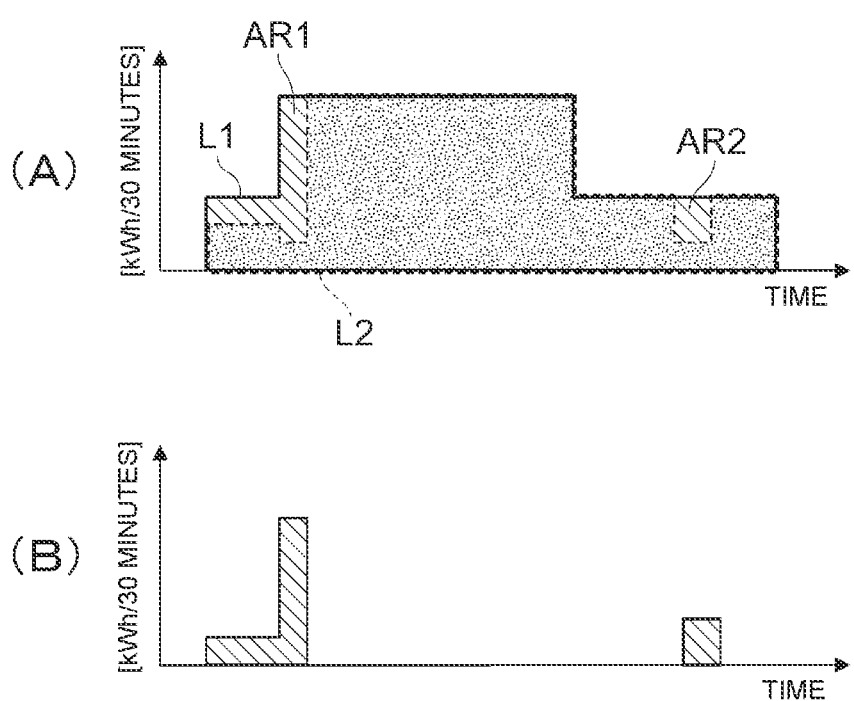
FIG. 20A and FIG. 20B are conceptual diagrams explaining the unsigned consumer list presentation processing.

In FIG. 20A, the area framed with a solid line L1 shows the electrical energy in a certain period in the future which has been procured by the power generation/procurement office of the energy company 2, and the area framed with a broken line L2 shows the electrical power demand in that period which is estimated by the data analyzing device 12 of the analysis company 11. Note that the term "procured electrical energy" as used herein refers not only to the electrical energy that was reserved for purchase by the power generation/procurement office through the electric power exchange, it also indicates the total value of the electrical energy which also includes the power generation amount instructed by the power generation/procurement office to the power generation facility in cases where the energy company 2 is a power generation facility. The same applies in the ensuing explanation. In FIG. 20A, the electrical energy of the areas AR1, AR2 indicated with diagonal lines may become the excess electrical energy.

Thus, the sales information processing apparatus 5 of this embodiment is equipped with an unsigned consumer list presentation function for presenting a list (this list is hereinafter referred to as the "unsigned consumer list") which includes, as candidates with whom an energy sales contract should be newly concluded, the unsigned consumers who use electricity in a pattern shown in FIG. 18B which is the same as the foregoing excess electrical energy.

Figure 21:
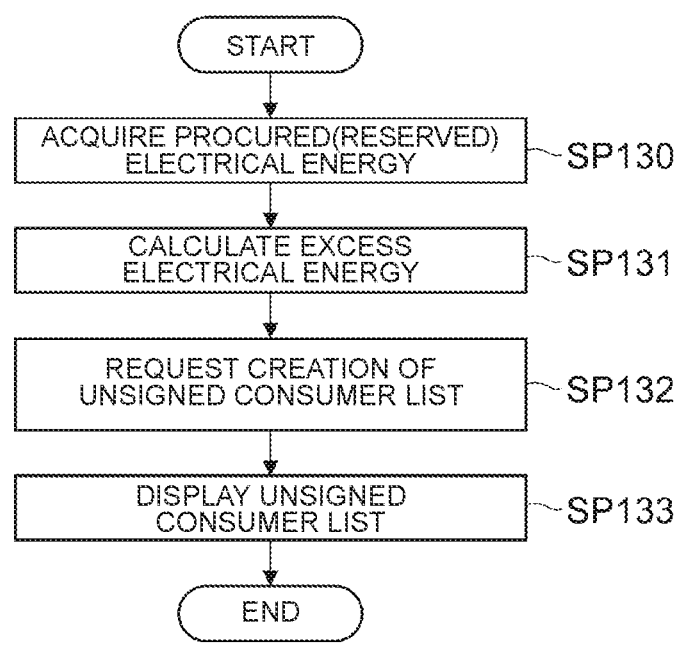
FIG. 21 is a flowchart showing a processing routine of the unsigned consumer list presentation processing.

FIG. 21 shows the processing routine of the unsigned consumer list presentation processing to be executed in the sales information processing apparatus 5 in relation to the foregoing unsigned consumer list presentation function. The unsigned consumer list presentation processing is executed by the unsigned consumer list creation program 36 stored in the memory 33 (FIG. 3) of the sales information processing apparatus 5.

In effect, the unsigned consumer list creation program 36 starts the unsigned consumer list presentation processing shown in FIG. 21 according to prescribed operations performed to the sales information processing apparatus 5 (FIG. 1), and foremost acquires data representing the procured electrical energy for a prescribed time from the traded product information processing apparatus 6 (FIG. 1) (SP130), and compares the procured electrical energy recognized based on the acquired data and the future demand electrical energy in the energy company 2 that is notified from the data analyzing device 12 as described above.

Subsequently, the unsigned consumer list creation program 36 calculates the difference between the procured electrical energy and the estimated value of the future demand electrical energy based on the comparative result, and thereby calculates the excess electrical energy that is expected to arise within the foregoing prescribed time period (SP131). Furthermore, the unsigned consumer list creation program 36 thereafter sends a request for creating the foregoing unsigned consumer list (this request is hereinafter referred to as the "unsigned consumer list creation request") to the data analyzing device 12 of the analysis company 2, together with the data of the excess electrical energy calculated in step SP131 (SP132).

Consequently, the data analyzing device 12 that received the unsigned consumer list creation request detects a consumer class having a standard load curve that is similar to the temporal variation of the excess electrical energy (this consumer class is hereinafter referred to as the "specific consumer class") by referring to the class attribute information table 30B (FIG. 7). Furthermore, the data analyzing device 12 classifies the unsigned consumers 8 among the consumers 8 registered in the foregoing list of all consumers into one of the consumer classes by using the diagnostic decision tree described above with reference to FIG. 14. Furthermore, the data analyzing device 12 creates the foregoing unsigned consumer list including the respective unsigned consumers 8 classified into the specific consumer class as sales promotion destination candidates, and sends the data of the created unsigned consumer list (this data is hereinafter referred to as the "unsigned consumer list data") to the sales information processing apparatus 5. Moreover, a specific consumer class having a standard load curve that is similar to the temporal variation of the excess electrical energy may also be obtained based on identification processing using the data of the foregoing cluster center set $\{C_k: k=1, 2, \ldots, N\}$ and the k-means clustering.

The unsigned consumer list creation program 36 of the sales information processing apparatus 5 that received the unsigned consumer list data displays the unsigned consumer list based on the unsigned consumer list data (SP133), and thereafter ends the unsigned consumer list presentation processing.

(5) Summation of Electrical Energy Sold

The summation processing of the electrical energy sold to be executed in the energy selling system 1 separate from the series of processing described above is now explained. The sales information processing apparatus 5 may add, as the electrical energy sold, the generated outline data of the load curve within the analyzing period for each consumer 8, calculate the power generation/procurement required in the respective time frames within the analyzing period, and perform processing of instructing the traded product information processing apparatus 6 to procure power.

(6) Effect of this Embodiment

With the energy selling system 1 of this embodiment described above, since the cluster number to be used upon clustering the load data of the respective consumers 8 is decided based on the intra-cluster relevance representing the degree of unity of the load data in the individual clusters and the inter-cluster average degree of separation representing the degree of separation of the clusters and the load data is clustered in the decided cluster number as described above with reference to FIG. 11, the load data of the respective consumers 8 can be clustered to a cluster number that matches the actual situation.

Consequently, according to the energy selling system 1, it is possible to appropriately classify the consumers 8 into a plurality of consumers classes, and the subsequent data analytical processing can be performed reliably based on the classification result.

Furthermore, with the energy selling system 1 of this embodiment, since a diagnostic decision tree as shown in FIG. 14 is created with the final unit of profiling of the individual consumers 8 as the segmentation result based on the attribute information and supplementary information of the consumers 8, the new consumers 8 from which the load data has not been acquired and the existing consumer 8 (new consumers 8) from which the load cannot be acquired because the equipment control terminal 9 (FIG. 1) has not been installed can also be classified into appropriate clusters.

(7) Effect of this Embodiment

Note that, while the foregoing embodiment explained a case of applying the present invention to the energy selling system 1 configured as shown in FIG. 1, the present invention is not limited thereto, and the present invention can be broadly applied to data analyzing systems of various types of configurations which perform various types of data analysis based on the load data and attribute information of the respective consumers who receive electric power supplied from an energy company.

Moreover, while the foregoing embodiment explained a case of applying the k-means clustering as the means upon obtaining the cluster center $C_k$ of the respective clusters in cases of respectively classifying the load data in 1 to M (M is number of consumers 8) clusters in consumer units, the present invention is not limited thereto, and various other means may be broadly applied.

INDUSTRIAL APPLICABILITY

The present invention can be broadly applied to a data analyzing system for performing various types of data analysis based on load data and attribute information of the respective consumers who receive electric power supply from an energy company.

REFERENCE SIGNS LIST

1: energy selling system
2: energy company
3: meter data collection server
4: consumer information providing server
5: sales information processing apparatus
6: traded product information processing apparatus
7: corporate information processing apparatus
8: consumer
9: equipment control terminal
10: information I/O terminal
11: analysis company
12: data analyzing device
21, 32: CPU
25: clustering processing program
26: standard load curve outline data generation processing program
27: diagnostic decision tree generation processing program
28: consumer data analytical processing program
29: energy company transmission data database
30: class and cluster information database
30A: cluster attribute information table
30B: class attribute information table
36: unsigned consumer list creation program
37: contract conclusion processing program
TR1, TR2: diagnostic decision tree

The invention claimed is:
1. A data analyzing device comprising:
a storage unit, comprising at least a memory, that stores a clustering processing program, which is a computer program for performing clustering processing and processing for determining a number of clusters, and a processor, coupled to the storage unit, that, by executing the clustering processing program:

performs the clustering processing, which includes:

calculating a feature quantity of data by performing frequency analysis of the data for each unit time, the data indicating power usage per unit of time, and for each of a plurality of different cluster numbers, wherein each cluster number indicates a number of clusters, testing to classify each piece of data into the number of clusters indicated by the respective cluster number based on periodicity of the data for each unit time using the feature quantity calculated by the frequency analysis, and performs the processing for determining the number of clusters, which includes:

determining a cluster number, of the plurality of different cluster numbers, that indicates a number of clusters that the pieces of data are to be classified therein, based on at least one of an intra-cluster relevance and an inter-cluster average degree of separation of the plurality of cluster numbers, wherein, for each of the plurality of the cluster numbers, the intra-cluster relevance represents a degree of unity of the pieces of data in each cluster, and wherein, for each of the plurality of the cluster numbers, the inter-cluster average degree of separation represents a degree of separation between the clusters.

2. The data analyzing device according to claim 1, wherein the processor is configured to:

calculate, as a relevance optimal cluster number, a minimum cluster number in which a ratio of a variation of the intra-cluster relevance relative to a variation of the cluster number is equal to or less than a predetermined first threshold, and calculate, as a degree of separation optimal cluster number, a minimum cluster number in which a ratio of a variation of the inter-cluster average degree of separation relative to a variation of the cluster number is equal to or less than a predetermined second threshold.

3. The data analyzing device according to claim 2, wherein the processor is configured to:

if at least one cluster number exists between the relevance optimal cluster number and the degree of separation optimal cluster number, determine one of the cluster numbers existing between the relevance optimal cluster number and the degree of separation optimal cluster number as the determined cluster number, and if no cluster number exists between the relevance optimal cluster number and the degree of separation optimal cluster number, determine either the relevance optimal cluster number or the degree of separation optimal cluster number as the determined cluster number.

4. The data analyzing device according to claim 1, wherein the processor is configured to generate a diagnostic decision tree for classifying at least one of the pieces of data into one of the clusters based on the attribute information of the at least one of the pieces of data.

5. The data analyzing device according to claim 4, wherein the diagnostic decision comprises:

a first diagnostic decision tree for associating a new piece of data with one of the clusters based on attribute information of that new piece of data; and a second diagnostic decision tree for associating the new piece of data with one of the clusters which was generated, with a leaf, in which the cluster of a distribution destination of the corresponding new piece of data has not been identified, among the leaves of the first diagnostic decision tree as a route.

6. The data analyzing device according to claim 1, wherein the processor is configured to, as for load data representing power usage in each unit time, calculate transition data representing transition of power usage for the cluster into which the load data is classified, and calculate a future transition of power usage based on the transition data and information associated with power use.

7. The data analyzing device according to claim 1, wherein the processor is configured to issue an instruction for power procurement based on an estimated future power usage of a customer, which is based on at least the determined classification of the data into the clusters.

8. The data analyzing device according to claim 1, wherein the processor is configured to determine and provide a rate menu which is recommended based on a standard load curve representing transition of standard power usage of consumers who belong to a consumer class and statistical information with respect to the consumer class, wherein the consumer class is determined based on at least the determined classification of the data into the clusters.

9. The data analyzing device according to claim 1, wherein the processor is configured to:

determine a consumer class to which an unsigned consumer belongs, based on attribute information of the unsigned consumer, and issue data of a load curve representing future power usage about the unsinged consumer which is estimated based on a standard load curve representing a transition of standard power usage of consumers that belong to the determined consumer class, wherein data of the unsigned consumer is not included in the data classified into the clusters, and wherein the consumer class is determined based on at least the determined classification of data into the clusters.

10. A data analyzing method, comprising steps of:

in a clustering process:

calculating a feature quantity of data by performing frequency analysis of the data for each unit time, the data indicating power usage per unit of time, and for each of a plurality of different cluster numbers, wherein each cluster number indicates a number of clusters, testing to classify each piece of data into the number of clusters indicated by the respective cluster number based on periodicity of the data for each unit time using the feature quantity calculated by the frequency analysis; and in a process of determining a number of clusters:

determining a cluster number, of the plurality of different cluster numbers, that indicates a number of clusters that the prices of data are to be classified therein, based on at least one of an intra-cluster relevance and an inter-cluster average degree of separation of the plurality of cluster numbers, wherein, for each of the plurality of cluster numbers, the intra-cluster relevance represents a degree of unity of pieces of data in each cluster, and wherein, for each of the multiple cluster numbers, the inter-cluster average degree of separation represents a degree of separation between the clusters.

* * * * *